US012560710B2

(12) United States Patent
Iwata

(10) Patent No.: US 12,560,710 B2
(45) Date of Patent: Feb. 24, 2026

(54) UNDERWATER DETECTION DEVICE AND UNDERWATER DETECTION METHOD

(71) Applicant: Furuno Electric Co., Ltd., Nishinomiya (JP)

(72) Inventor: Kohei Iwata, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 206 days.

(21) Appl. No.: 18/204,969

(22) Filed: Jun. 2, 2023

(65) Prior Publication Data

US 2023/0393270 A1 Dec. 7, 2023

(30) Foreign Application Priority Data

Jun. 3, 2022 (JP) ................................. 2022-091197

(51) Int. Cl.
| | |
|---|---|
| *G01S 15/42* | (2006.01) |
| *G01S 7/52* | (2006.01) |
| *G01S 15/89* | (2006.01) |
| *G01S 15/96* | (2006.01) |

(52) U.S. Cl.
CPC ............ *G01S 15/42* (2013.01); *G01S 7/5202* (2013.01); *G01S 15/89* (2013.01); *G01S 15/96* (2013.01)

(58) Field of Classification Search
CPC ........ G01S 15/42; G01S 7/5202; G01S 15/89; G01S 15/96
See application file for complete search history.

(56) References Cited

U.S. PATENT DOCUMENTS

| | | | |
|---|---|---|---|
| 11,320,534 B2 | 5/2022 | Kozuki | |
| 2017/0123062 A1* | 5/2017 | Coleman | .............. G01S 15/102 |
| 2020/0025917 A1* | 1/2020 | Kozuki | ................. G01S 15/89 |
| 2020/0371233 A1* | 11/2020 | Suzuki | ................. G01S 15/89 |

FOREIGN PATENT DOCUMENTS

| | | | |
|---|---|---|---|
| KR | 20200029210 A * | 3/2020 | ............. H04N 5/217 |
| WO | 2018/163844 A1 | 9/2018 | |

OTHER PUBLICATIONS

Extended European Search Report issued Sep. 18, 2023, in corresponding European Application 23176544.7, 10pp.

* cited by examiner

*Primary Examiner* — Abdallah Abulaban
(74) *Attorney, Agent, or Firm* — XSENSUS LLP

(57) ABSTRACT

An underwater detection device includes a transmitter, a receiver, an actuator, a controller, and a signal processor. The transmitter transmits a transmission wave. The receiver receives a reflection wave of the transmission wave. The actuator rotates the transmitter and the receiver in a mutually synchronized fashion. The controller makes the transmitter transmit a plurality of transmission waves at mutually different frequencies in order, for every given unit rotation angle. The signal processor generates an echo signal for indication in a direction of the unit rotation angle based on a reception signal at each of the frequencies acquired from a range of the unit rotation angle.

4 Claims, 15 Drawing Sheets

COMPARATIVE EXAMPLE

EMBODIMENT

UNDERWATER DETECTION DEVICE AND UNDERWATER DETECTION METHOD

CROSS-REFERENCE TO RELATED APPLICATION(S)

This application claims priority under 35 U.S.C. § 119 to Japanese Patent Application No. 2022-091197, which was filed on Jun. 3, 2022, the entire disclosure of which is hereby incorporated by reference.

TECHNICAL FIELD

The present disclosure relates to an underwater detection device and an underwater detection method, which transmit a transmission wave underwater and detect a target object based on a reflection wave thereof.

BACKGROUND OF THE DISCLOSURE

Conventionally, it is known that an underwater detection device transmits a transmission wave underwater and detects a target object based on a reflection wave thereof. This kind of underwater detection device detects a position of the target object around a ship, for example, by rotating an ultrasonic transducer capable of forming a narrow beam.

The underwater detection device includes a transmitter having one or more ultrasonic transducers, and a receiver having a plurality of ultrasonic transducers. The receiver is disposed separately from the transmitter. The underwater detection device rotates the transmitter and the receiver so that the rotation of the receiver synchronizes with the rotation of the transmitter. A reception beam is scanned in the depth direction by beamforming for signals outputted from the plurality of ultrasonic transducers disposed at the receiver. In this way, an echo signal is generated over all the area around the ship. Based on the generated echo signal, an echo image in which the position from the receiver is associated with an echo intensity at the position is generated. WO2018/163844A1 discloses this kind of underwater detection device.

Some of the underwater detection devices may use transmission and reception processing of a so-called "multi-ping method" in which a plurality of transmission waves having mutually different frequencies are transmitted. In this method, during a period when a transmission wave of a given frequency is transmitted and received, another transmission wave at another frequency is transmitted. A filter extracts a signal at each frequency from signals outputted from the ultrasonic transducers of the receiver.

Therefore, during a period when a transmission wave at one frequency is transmitted and received, an echo signal at this frequency is acquirable, as well as an echo signal at another frequency. For this reason, the transmitter and the receiver can be rotated at a high speed to shorten an updating period of the echo image. As the number of transmission waves transmitted in one cycle (the number of frequencies) is increased, the rotational speeds of the transmitter and the receiver can be raised to shorten the updating period of the echo image.

However, on the other hand, when the receiver rotates as described above, an acquiring direction of the reception signal at a given frequency changes with the rotation of the receiver. That is, the reception signal originally to be acquired for one direction (bearing) includes the reception signal for another direction different from the one direction. For this reason, the position of the target object displayed on the echo image has some errors. This problem becomes more remarkable as the rotational speeds of the transmitter and the receiver are raised (i.e., as the number of transmission waves transmitted in one cycle (the number of frequencies) is increased).

SUMMARY OF THE DISCLOSURE

The present disclosure is made in view of this problem, and one purpose thereof is to provide an underwater detection device and an underwater detection method, which are capable of suppressing an error in a position of a target object displayed on an echo image, when using transmission and reception processing of a multi-ping method.

The first aspect of the present disclosure relates to an underwater detection device. The underwater detection device according to this aspect includes a transmitter, a receiver, an actuator, a controller, and a signal processor. The transmitter transmits a transmission wave. The receiver receives a reflection wave of the transmission wave. The actuator rotates the transmitter and the receiver in a mutually synchronized fashion. The controller makes the transmitter transmit a plurality of transmission waves at mutually different frequencies in order, for every given unit rotation angle. The signal processor generates an echo signal for indication in a direction of the unit rotation angle based on a reception signal at each of the frequencies acquired from a range of the unit rotation angle.

According to the underwater detection device of the present disclosure, among the reception signals at the respective frequencies acquired from the range of the unit rotation angle, the echo signal for indication in the direction of the unit rotation angle is generated. Thus, it is suppressed that a reception signal other than those within the range of the unit rotation angle is used for generating the echo signal. Therefore, the positional error of the target object displayed on the echo image can be suppressed.

In the underwater detection device according to this aspect, the signal processor may generate the echo signal for indication based on, among the reception signals at the respective frequencies acquired from a plurality of sections that divide the range of the unit rotation angle into the number of frequencies in a direction separating from a rotation axis, a reception signal with the largest quantity of signal components in each of the sections.

According to this configuration, since the reception signal with the largest quantity of signal components in each of the sections is used for the generation of the echo signal, the state of the echo in the section is suitably reflected on the echo signal. Therefore, the echo signal for indication can be generated appropriately.

In this case, the sections may be formed by dividing the range of the unit rotation angle equally into the number of frequencies in the direction separating from the rotation axis.

According to this configuration, the echo signal for indication in the direction of the unit rotation angle can be generated from the reception signals at the respective frequencies included in the same period. Therefore, the generation processing of the echo signal for indication can be performed simply.

Further, the signal processor may perform, for every angle of depression, processing which includes calculating an intermediate echo signal at each angle of depression for each of the frequencies by beamforming based on the reception signal at the frequency, and extracting a signal portion of a period corresponding to the unit rotation angle from the intermediate echo signal at each of the frequencies, and arranging the extracted signal portions in order of later receiving timing to generate the echo signal for indication in the direction of the unit rotation angle.

According to this configuration, by the simple processing in which the signal portion is extracted from the intermediate echo signal at each of the frequencies and the signal portions are arranged in order, the echo signal for indication in each angle of depression in the direction of the unit rotation angle can be generated. Therefore, the generation processing of the echo signal for indication can be performed simply.

In this case, among divided parts when the entire range of the intermediate echo signal at each frequency is equally divided into the number of frequencies, the signal portion may be a divided part included during the period corresponding to the unit rotation angle.

According to this configuration, since the extraction range of the signal portion with respect to the intermediate echo signal is specified, the signal portion can be easily extracted from the intermediate echo signal at each frequency. Therefore, the generation processing of the echo signal for indication can be performed simply.

The second aspect of the present disclosure relates to an underwater detection method. The underwater detection method according to this aspect includes rotating a transmitter which transmits a transmission wave and a receiver which receives a reflection wave of the transmission wave in a mutually synchronized fashion, making the transmitter transmit a plurality of transmission waves at mutually different frequencies in order, for every given unit rotation angle, and generating an echo signal for indication in a direction of the unit rotation angle based on a reception signal at each of the frequencies acquired from a range of the unit rotation angle.

According to the underwater detection method of this aspect, similar effects to the first aspect can be achieved.

Effect of the Disclosure

As described above, according to the present disclosure, it is possible to provide the underwater detection device and the underwater detection method, which are capable of suppressing the error in a position of a target object displayed on an echo image, when using the transmission and reception processing of the multi-ping method.

The effect and the significance of the present disclosure will be further apparent from description of an embodiment below. However, the embodiment described below is illustration of implementation of the present disclosure, and the present disclosure is not limited in any way to what is described in the embodiment below.

DETAILED DESCRIPTION OF THE DISCLOSURE

Hereinafter, one embodiment of the present disclosure is described with reference to the accompanying drawings.

In the following embodiment, processing of a so-called "multi-ping method" is performed. The multi-ping method may also be referred to as a "multi-pulse method."

For example, according to a common underwater detection device of a pulse method, after a transmission pulse wave is transmitted, a reception part may receive a reflection wave of the transmission pulse wave, while the transmission pulse wave goes and comes back within a detection range. Then, after the time for the transmission pulse wave to go and come back within the detection range passes, the next transmission pulse wave may be transmitted.

On the other hand, according to the underwater detection device of the multi-ping method, after a transmission pulse wave at a given frequency is transmitted first, the next transmission pulse wave having a frequency different from the given frequency may be transmitted before the transmission pulse wave goes and comes back within a detection range. The reflection wave of each transmission pulse wave may be extracted by a filter corresponding to each frequency. Thus, according to the underwater detection device of the multi-ping method, a transmission interval of the transmission pulse wave can be narrowed. For this reason, a detection speed of a target object can be boosted, as compared with the common underwater detection devices of the pulse method.

A transmitter and a receiver of an underwater detection device 1 may be provided to the bottom of a ship (hereinafter, referred to as "the ship"). The underwater detection device 1 may be mainly used for detecting a target object, such as a fish and a school of fish. The underwater detection device 1 may also be used for detecting ups and downs of the seabed such as a reef, a structure such as an artificial fish reef, etc.

Below, a signal outputted from an ultrasonic transducer of the receiver is referred to as a "reception signal," and a signal indicative of a change in an echo intensity at each angle of depression generated by applying beamforming to the reception signal from the ultrasonic transducer is referred to as an "echo signal."

Figure 1:
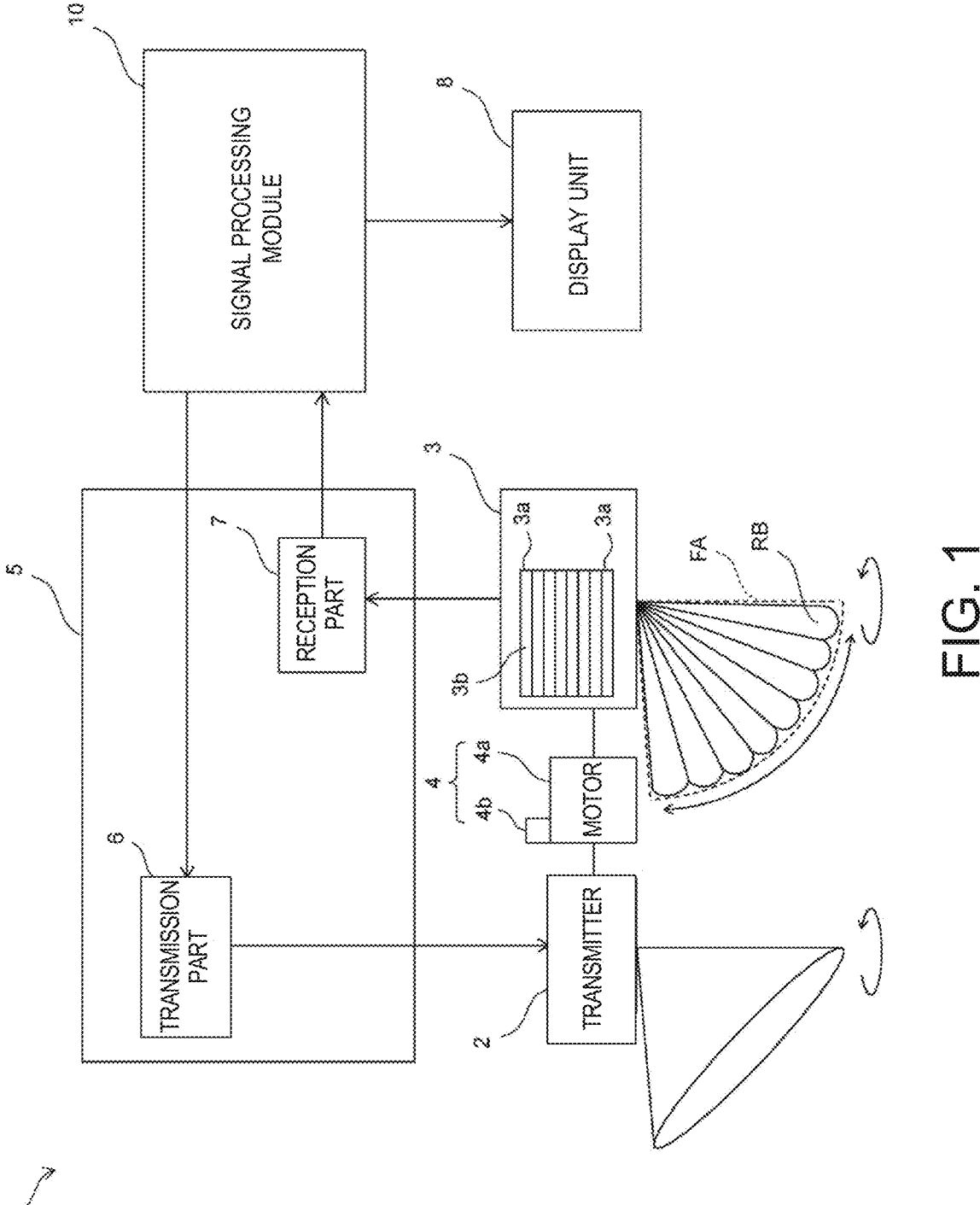
FIG. 1 is a block diagram illustrating a configuration of an underwater detection device according to one embodiment.

FIG. 1 is a block diagram illustrating a configuration of the underwater detection device 1.

As illustrated in FIG. 1, the underwater detection device 1 may include a transmitter 2, a receiver 3, an actuator 4, a transmission and reception device 5, a signal processing module 10, and a display unit 8.

The transmitter 2 may be provided with one or more ultrasonic transducers. The transmitter 2 may be capable of forming a three-dimensional transmission beam TB. The transmitter 2 may transmit a pulse-shaped ultrasonic wave (transmission pulse wave) underwater.

Figure 2:
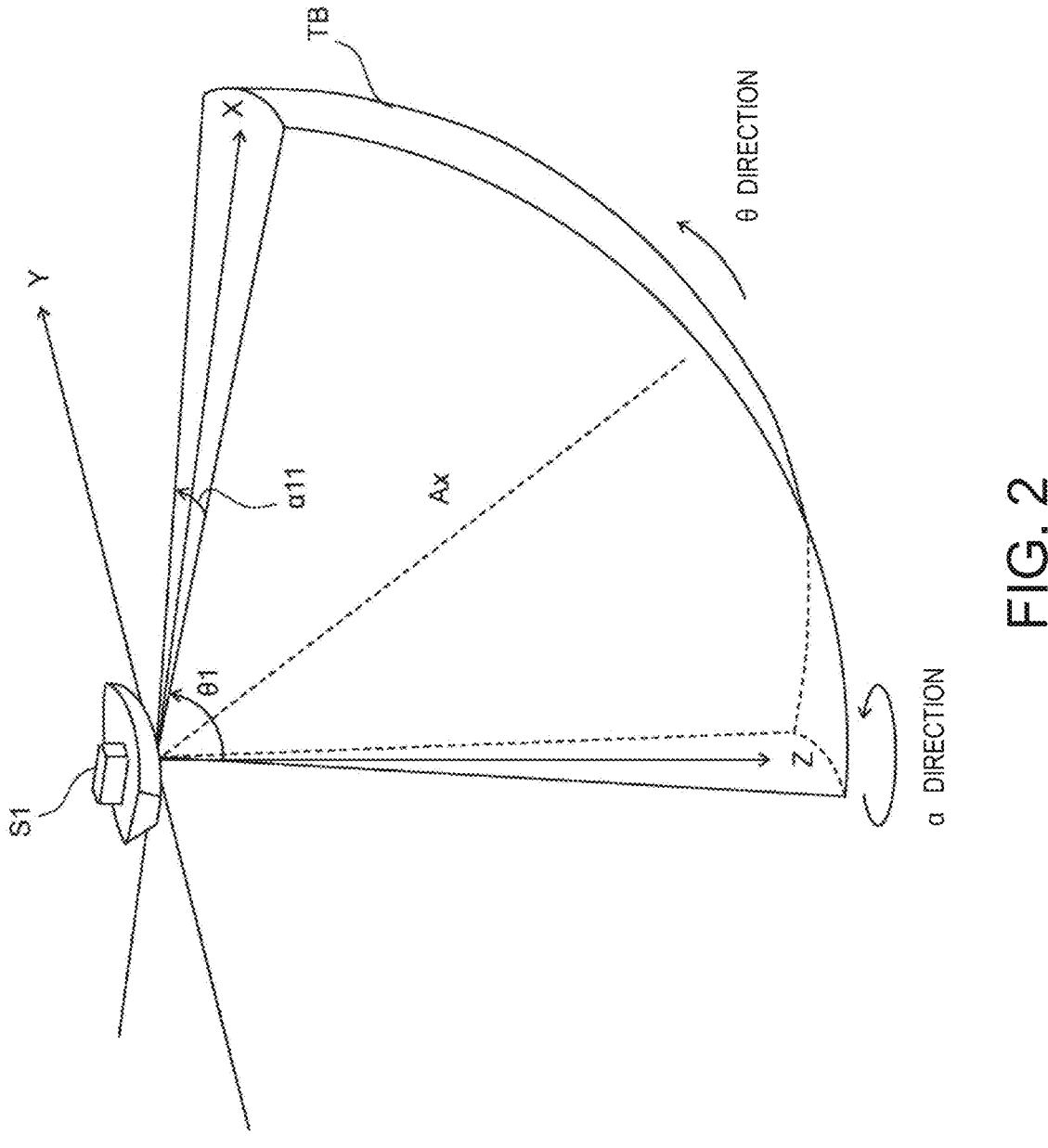
FIG. 2 is a view schematically illustrating a transmission beam formed by a transmitter, according to one embodiment.

FIG. 2 is a view schematically illustrating the transmission beam TB formed by the transmitter 2.

In FIG. 2, Z-axis is an axis extending vertically downward from the transmitter 2, and Y-axis is an axis which is parallel to a horizontal plane, and indicates a moving or traveling direction of the ship (S1). The X-axis is an axis perpendicular to both the Y-axis and the Z-axis. Here, a state of the transmission beam TB at a timing when the transmission pulse wave (transmission wave) is transmitted in a direction parallel to the X-axis, as seen in the vertical direction, is illustrated.

The transmitter 2 may be installed in the ship's bottom so that a center axis Ax of the transmission beam TB is oblique to the vertical direction (Z-axis direction). The transmission beam TB may spread horizontally at an angle $\alpha 11$, and have a substantially fan shape as seen in the circumferential direction centering on the Z-axis. The angle $\alpha 11$ may be 30°, for example. Without being limited to this angle, the angle $\alpha 11$ may be set within a range of 6° to 90°, for example.

The transmission beam TB may spread upwardly in the vertical direction within a range of an angle $\theta 1$ from the vertically downward direction as 0°. The angle $\theta 1$ may be 90°, for example. Without being limited to 90°, the angle $\theta 1$ may be about 60°. Further, for the vertical spread of the transmission beam TB, the boundary or reference may not necessarily be the vertically downward direction. For example, the transmission beam TB may spread vertically within a range of 30° to 90° with respect to the vertically downward direction. Further, the transmission beam TB may spread within a range of ±60° on both sides of the vertically downward direction.

Returning to FIG. 1, the receiver 3 may have a plurality of ultrasonic transducers 3a. These ultrasonic transducers 3a may be reception elements of the receiver 3. The receiver 3 may be installed separately from the transmitter 2. A reception surface 3b of each ultrasonic transducer 3a may be formed, for example, in a rectangular shape. Note that, in the example of FIG. 1, the receiver 3 may be provided with eight ultrasonic transducers 3a. The number of ultrasonic transducers 3a provided to the receiver 3 may be other numbers, without being limited to eight. Note that the shape and the orientation of each reception surface 3b are schematically illustrated in FIG. 1.

Each ultrasonic transducer 3a may receive the reflection wave of the transmission pulse wave transmitted from the transmitter 2, and generate a reception signal according to an echo intensity of the reflection wave. These ultrasonic transducers 3a may be arrayed linearly. That is, the receiver 3 may be a linear array. When the angle-of-depression direction is positive, an angle formed by a direction which is perpendicular to the reception surface of the linear array and is on the side where a reception beam RB is formed, and a horizontal plane may be 30°, for example. However, this angle may be other angles within a range from 0° which is an angle when the linear array is arrayed in the vertical direction to 90° which is an angle when the linear array is arrayed in the horizontal direction.

The actuator 4 may include a motor 4a and a rotation angle detector 4b. The motor 4a may rotate the transmitter 2 on a rotation axis parallel to the vertical direction. Therefore, the transmission beam TB may be rotated horizontally over all the directions centering on the ship S1 (Z-axis) of FIG. 2. Further, the motor 4a may rotate the receiver 3 on a rotation axis parallel to the vertical direction so that it synchronizes with the rotation of the transmitter 2. The transmitter 2 and the receiver 3 may rotate so that they are oriented in the same direction. Therefore, the reflection wave of the ultrasonic wave (transmission pulse wave) transmitted from the transmitter 2 may be received by the receiver 3. The transmitter 2 may rotate precedingly to the receiver 3.

The rotation angle detector 4b may detect a rotation angle of the motor 4a. The rotation angle detector 4b may be attached to the motor 4a. The rotation angle detector 4b may be a rotary encoder, for example. However, the method of detecting the rotation angle of the motor 4a is not limited to this configuration. For example, if the motor 4a is a stepping motor, the rotation angle of the motor 4a may be detected based on the number of steps from a reference position. Based on the rotation angle of the motor 4a, an angular position of the transmitter 2 and the receiver 3 with respect to a given reference axis in a horizontal plane may be detected. This reference axis may be set as an axis on the positive side of the X-axis in FIG. 2, for example.

While being rotated by the motor 4a as described above, the transmitter 2 may form the transmission beam TB for every given angle with respect to the reference axis, and transmit the ultrasonic wave (transmission pulse wave). Further, the receiver 3 may form the reception beam RB at each angular position where the transmission beam TB is transmitted from the transmitter 2, and generate the echo signal of the reflection wave. At each angular position, the receiver 3 may make the reception beam RB be scanned electronically in the vertical direction (angle-of-depression direction) by performing beamforming for the plurality of ultrasonic transducers 3a together with the transmission and reception device 5 and the signal processing module 10. The reception beam RB may be electronically scanned in the vertical direction (angle-of-depression direction) within a fan area FA.

Figure 3:
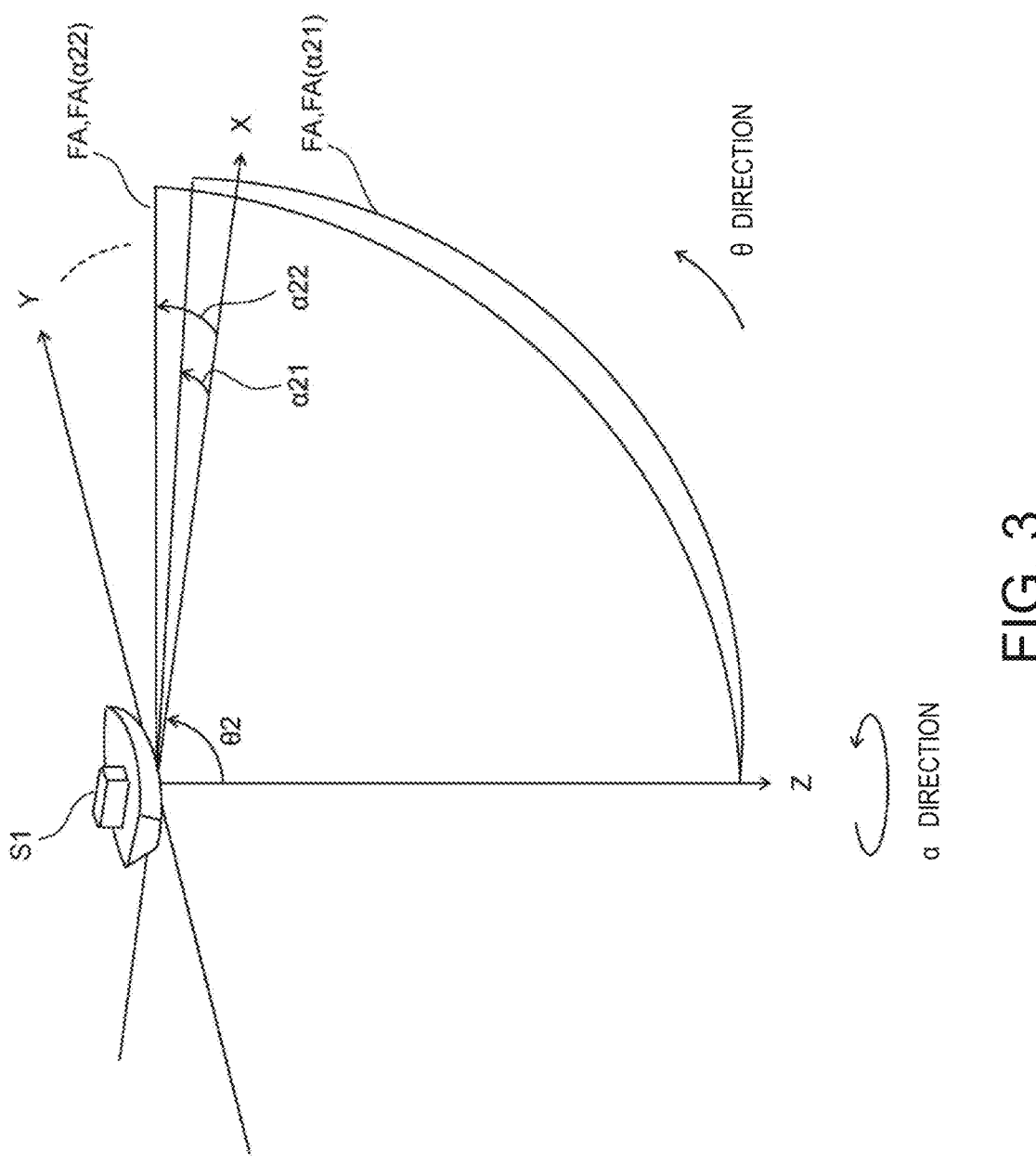
FIG. 3 is a view schematically illustrating a fan area which is an area where a reception beam is scanned electronically, according to one embodiment.

FIG. 3 is a view schematically illustrating the fan area FA which is an area where the reception beam RB is scanned electronically. The X-axis, the Y-axis, and the Z-axis of FIG. 3 are similar to those of FIG. 2.

The fan area FA may have a comparatively thin spread angle (about 6°) in the circumferential direction, and spread in the fan shape in the vertical direction from the ship S1 (angle-of-depression direction). In FIG. 3, the fan area FA when the angular position is a first angular position $\alpha 21$ is illustrated by FA($\alpha 21$), and the fan area FA when the angular position is a second angular position $\alpha 22$ is illustrated by FA($\alpha 22$).

A vertical angle $\theta 2$ of the fan area FA may be about 90°, for example. The fan area FA may be formed in a range from a vertically downward direction to the horizontal direction. The reception beam RB scanned electronically within the fan area FA may be rotated in an a-direction along the horizontal plane by the motor 4a of FIG. 1, together with the fan area FA. Therefore, a target object may be detected in a hemispherical three-dimensional space centering on the ship S1, and a three-dimensional position of the target object in this space may be estimated.

Note that the angle θ2 is not limited to 90°. Further, the boundary at the angle θ2 may not be the vertically downward direction. For example, the angle θ2 may be within an angle range from 30° to 90° with respect to the vertically downward direction. Further, the angle θ2 may be within a range of 60° with respect to the vertically downward direction.

In this embodiment, wave transmission and reception may be performed by the so-called "multi-ping method" as described above. In detail, the transmission pulse wave may be transmitted at each angular position so that the frequency of the transmission pulse wave transmitted from the transmitter 2 becomes different at adjacent angular positions.

For example, four frequencies f1, f2, f3, and f4 may be prepared for the transmission pulse wave, and these frequencies f1, f2, f3, and f4 may be cyclically set to the respective angular positions. From signals outputted from the receiver 3 at the angular positions, a signal at the frequency set to the angular position concerned may be extracted, and the echo signal may be generated based on the extracted signal. As described above, the echo signal may be generated based on the reception beam RB formed by the beamforming.

The details of signal processing by the multi-ping method are described in WO2018/163844A1 which was filed previously by the present applicant. The disclosure of WO2018-163844A1 may be incorporated herein by reference.

Returning to FIG. 1, the transmission and reception device 5 may include a transmission part 6 and a reception part 7.

The transmission part 6 may amplify the transmission pulse signal generated by the signal processing module 10, and apply the amplified transmission pulse signal to the transmitter 2. Therefore, the transmission pulse wave corresponding to the amplified transmission pulse signal may be transmitted from the transmitter 2. In detail, from the transmitter 2, a first transmission pulse wave corresponding to the transmission pulse signal at the frequency f1, a second transmission pulse wave corresponding to the transmission pulse signal at the frequency f2, a third transmission pulse wave corresponding to the transmission pulse signal at the frequency f3, and a fourth transmission pulse wave corresponding to the transmission pulse signal at the frequency f4 may be transmitted at a given interval (transmission cycle). Thereafter, this transmission may be cyclically repeated at the given interval (transmission cycle). Therefore, as described above, at adjacent angular positions of the transmitter 2 (angular positions at a transmission timing), the transmission pulse waves at different frequencies may be transmitted.

The reception part 7 may amplify the reception signal outputted from the receiver 3, and perform an A/D conversion of the amplified reception signal. Since the intensity of the reflection wave (echo) is attenuated as the distance becomes longer, the reception signal may be amplified more as the distance becomes longer so that this attenuation is eliminated. Then, the reception part 7 may output the reception signal converted into a digital signal to the signal processing module 10. In more detail, the reception part 7 may have a plurality of reception circuits, and each reception circuit may perform the above-described given processing to each reception signal of the reflection wave received by the corresponding ultrasonic transducer 3a, and output the reception signal to the signal processing module 10.

The signal processing module 10 may generate the above-described transmission pulse signal, and output the generated transmission pulse signal to the transmission part 6. Further, the signal processing module 10 may process the reception signal inputted from the reception part 7, and perform processing for generating image data of the target object. A configuration of the signal processing module 10 will be described later with reference to FIG. 4.

The display unit 8 may be provided with a monitor for displaying an image, and display the image according to the image data outputted from the signal processing module 10. In this embodiment, a state in the sea (underwater state) below the ship may be displayed three-dimensionally on the display unit 8. Therefore, by looking at the image, a user can grasp the underwater state below the ship (for example, the existence and the position of a single fish and a school of fish, ups and downs of the seabed, and a structure such as an artificial fish reef). Note that generation processing of the image data, and examples of indication of the image based on the image data will be described later with reference to FIGS. 6 to 12C.

Figure 4:
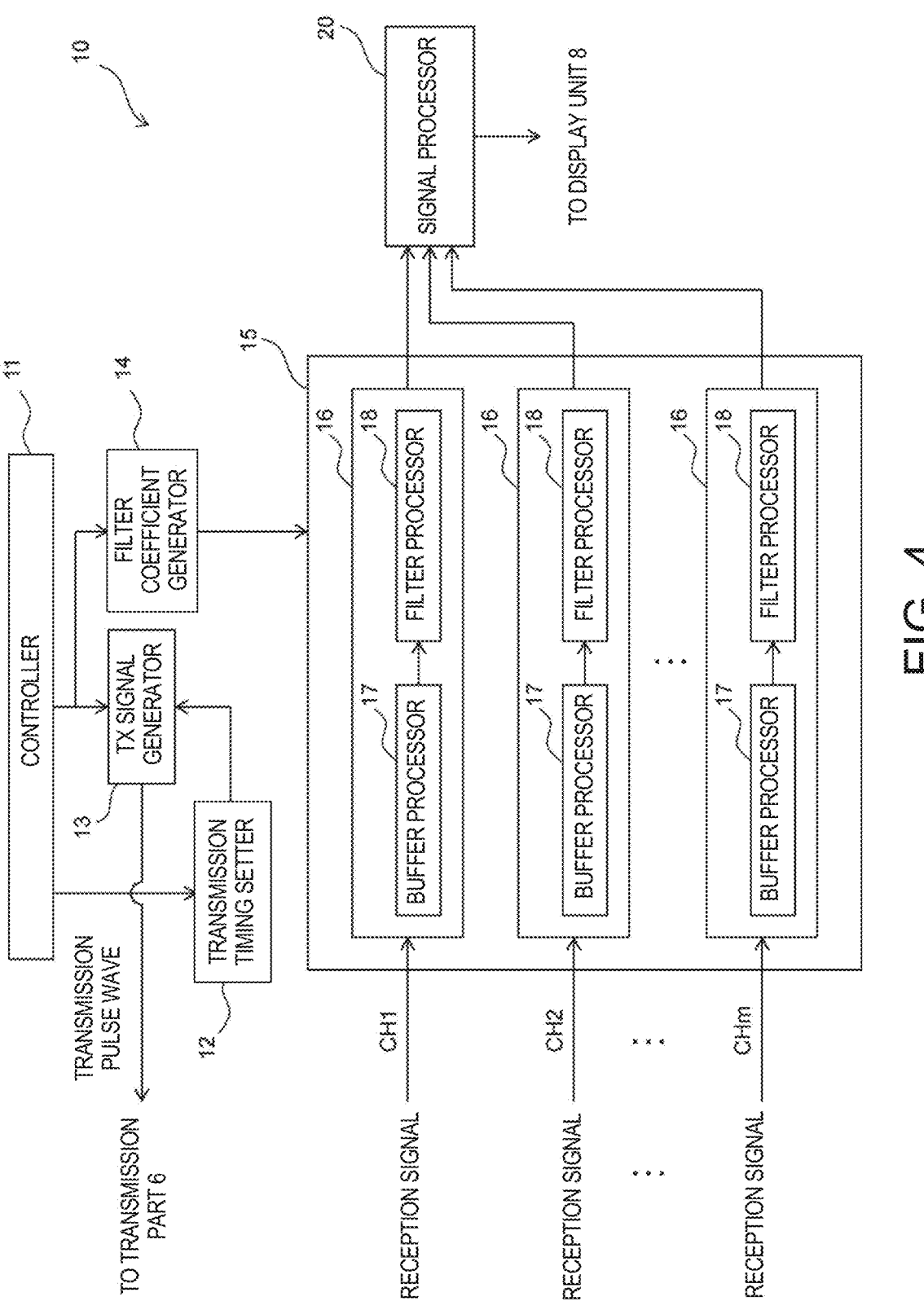
FIG. 4 is a block diagram illustrating a configuration of a signal processing module, according to one embodiment.

FIG. 4 is a block diagram illustrating the configuration of the signal processing module 10.

The signal processing module 10 may be comprised of a personal computer, for example. The signal processing module 10 may include an arithmetic processing circuit, such as a CPU (Central Processing Unit), and a storage medium, such as a ROM (Read Only Memory), a RAM (Random Access Memory), and a hard disk drive. The storage medium may store a program for realizing processing for underwater detection. The signal processing module 10 may perform a function of each part illustrated in FIG. 4 by using this program. That is, in FIG. 4, functional blocks executed by the signal processing module 10 based on the program are illustrated.

Note that the function of each block in FIG. 4 may not necessarily need to be realized by software, such as the program. That is, a part of the function illustrated in FIG. 4 may be realized by hardware, such as logic circuitry, instead of being the function by the program.

As illustrated in FIG. 4, the signal processing module 10 may include a controller 11, a transmission timing setter 12, a transmission signal generator 13, a filter coefficient generator 14, a signal acquirer 15, and a signal processor 20.

The controller 11 may control each part according to the above-described program. The controller 11 may detect the angular position of the transmitter 2 based on the detection result from the rotation angle detector 4b illustrated in FIG. 1. The controller 11 may notify to the transmission timing setter 12 a timing at which the transmission pulse wave is to be transmitted based on the detected angular position. At the same time, the controller 11 may output information on the frequency of the transmission pulse wave at each timing (i.e., any of the frequencies f1 f2, f3, and f4) to the transmission signal generator 13 (hereinafter, referred to as the "frequency information").

The transmission timing setter 12 may output to the transmission signal generator 13 a trigger signal for outputting the transmission pulse signal at each frequency according at the timing notice inputted from the controller 11.

The transmission signal generator 13 may output to the transmission part 6 the transmission pulse signal at any of the frequencies f1, f2, f3, and f4 according to the trigger signal inputted from the transmission timing setter 12, and the frequency information inputted from the controller 11.

Therefore, at each angular position where the transmission pulse wave is to be transmitted, the transmission pulse wave at any of the frequencies f1, f2, f, and f4 may be transmitted from the transmitter 2.

Further, when the controller 11 outputs the frequency information to the transmission signal generator 13, it may output similar frequency information to the filter coefficient generator 14. At this same time, the controller 11 may output to the filter coefficient generator 14 a filter specification for generating a filter coefficient used in filtering processing (for example, the center frequency of a pass band, a bandwidth of the pass band, an attenuation level in a stopband, a filter length, etc.).

Based on the frequency information and the filter specification which are inputted from the controller 11, the filter coefficient generator 14 may generate the filter coefficient for extracting the reception signal at the frequency specified by the frequency information. That is, the filter coefficient generator 14 may generate a filter coefficient C1, when the frequency specified by the frequency information is f1. Similarly, the filter coefficient generator 14 may generate filter coefficients C2, C3, and C4, when the frequencies specified by the frequency information are frequencies f2, 3, and f4, respectively. The filter coefficient generator 14 may notify the generated filter coefficient (any of the filter coefficients C1, C2, C3, and C4) to the signal acquirer 15.

Note that the filter coefficients C1, C2, and C3 may not need to be generated each time from the frequency information and the filter specification, and the filter coefficients C1, C2, and C3 may be stored beforehand in a memory so as to be associated with the frequencies f1, f2, and f3. In this case, the filter coefficient associated with the frequency specified by the frequency information may be read from the memory, and may be notified to the signal acquirer 15.

The signal acquirer 15 may have the same number of signal extractors 16 as the ultrasonic transducers 3a disposed at the receiver 3. The signal extractors 16 may be provided corresponding to the ultrasonic transducers 3a, respectively. The reception signals outputted from 1st to m-th ultrasonic transducers 3a may be inputted into the corresponding signal extractors 16 via respective channels CH1-CHm. Each signal extractor 16 may extract from the inputted reception signal a signal component of the frequency specified by the frequency information, and output the extracted signal component to the signal processor 20 as a reception signal to be processed.

The signal extractor 16 may include a buffer processor 17 and a filter processor 18. The buffer processor 17 may have buffer areas respectively corresponding to the frequencies f1-f4. The buffer processor 17 may temporarily store the reception signal inputted from the corresponding channel after the frequency information on the frequency fk is notified, until the frequency information on the same frequency fk is notified next, and output the stored reception signal to the filter processor 18.

The filter processor 18 may apply to the reception signal inputted from the buffer processor 17 the filter coefficient inputted from the filter coefficient generator 14 (any of the filter coefficients C1, C2, C3, and C4), that is, the filter coefficient at the frequency fk corresponding to the reception signal, and extract the frequency component at the frequency fk (any of the frequencies f1, f2, f3, and f4) corresponding to the filter coefficient from the inputted reception signal. The filter processor 18 may output the extracted frequency component to the signal processor 20 as the reception signal to be processed.

By the above processing, the reception signal for the transmission pulse wave at the given frequency (any of the frequencies f1, f2, 3, and f4) transmitted at each angular position may be extracted by the corresponding signal extractor 16 for every channel. Therefore, while the transmitter 2 and the receiver 3 carry out one horizontal revolution, the reception signal for the echo from the hemispherical three-dimensional space centering on the ship S1 may be acquired for every channel, and the acquired reception signal may be outputted to the signal processor 20.

The signal processor 20 may process the reception signal of each channel inputted from the signal acquirer 15 to generate the image data (echo image). After the signal processor 20 applies a decimation and a bandlimitting filter to the reception signal acquired for every channel at each rotational position, it may apply the beamforming to acquire the echo signal for every reception beam RB. The reception beam RB may be scanned in the 0 direction (angle-of-depression direction) in FIG. 3 at a given resolution. Therefore, the echo signal may be acquired at the same resolution as that of the reception beam RB in the 0 direction (angle-of-depression direction) of FIG. 3, for one fan area FA.

The echo signal at each angle of depression may be a signal indicative of a relationship between a distance from the receiver 3 (a lapsed time from the transmission) at this angle of depression, and the intensity of the reflection wave (echo). The echo signal at each angle of depression may be acquired for every given rotation angle.

Meanwhile, according to the underwater detection device 1 described above, the rotational speeds of the transmitter 2 and the receiver 3 can be increased to shorten the updating period of the echo image, as the number of transmission pulse waves (the number of frequencies) transmitted in one transmission-and-reception cycle (a period during which the transmission pulse wave goes and comes back within the detection range) increases.

However, on the other hand, when the receiver 3 rotates as described above, the acquiring direction of the reception signal at the given frequency may change with the rotation of the receiver 3. That is, the reception signal originally to be acquired for one direction may include the reception signal for another direction different from this direction.

For this reason, when the echo signal is generated from the reception signal at one frequency (any of f1-f4) corresponding to each angular position, the error may occur in the position of the target object displayed on the echo image. This problem may become more remarkable as the rotational speeds of the transmitter 2 and the receiver 3 are increased (i.e., as the number of transmission pulse waves transmitted in one cycle (the number of frequencies) is increased).

Figures 5A, 5B, 5C:
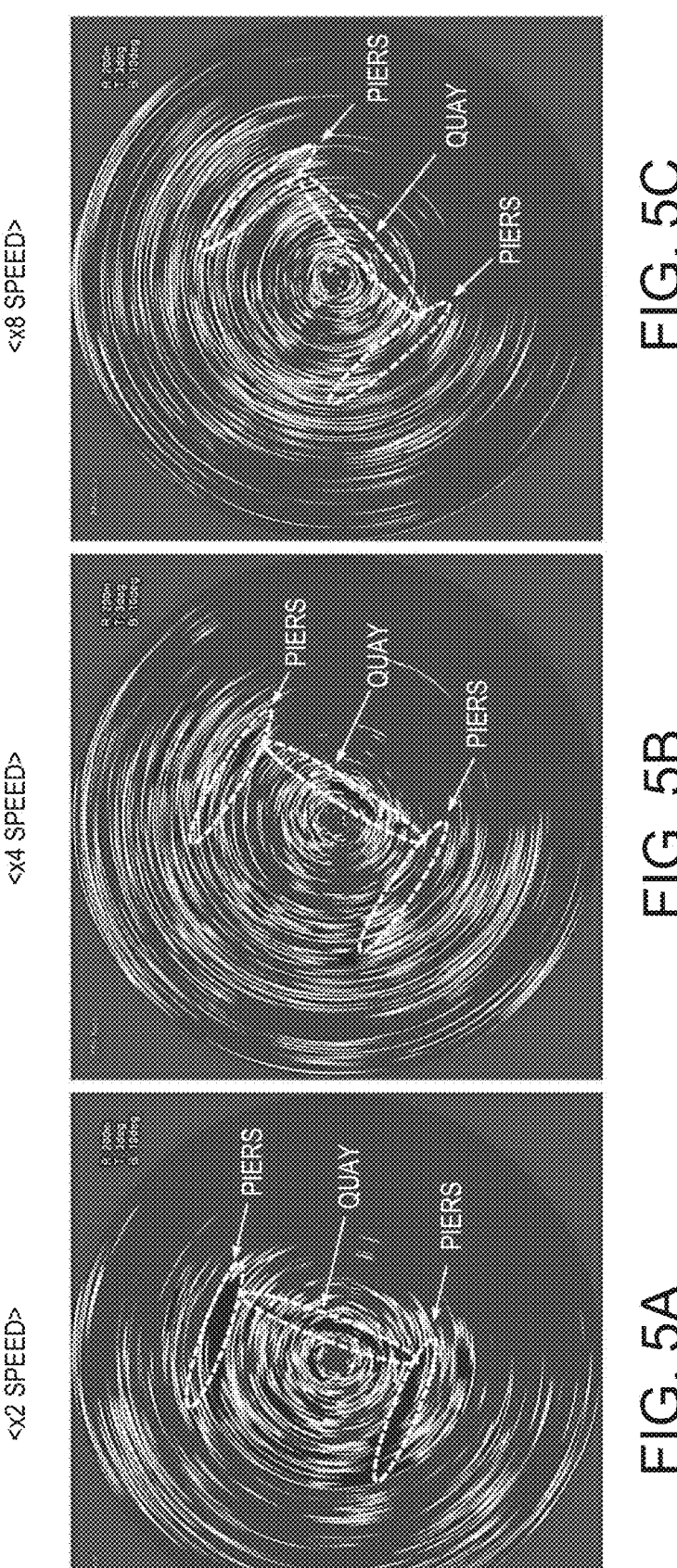
FIGS. 5A to 5C are views illustrating examples of indication of an echo image according to a comparative example.

FIGS. 5A to 5C are views illustrating one example of indication of the echo image when the echo signal is generated from the reception signal at one frequency corresponding to each angular position.

In FIGS. 5A to 5C, the echo image when underwater is seen vertically downward is illustrated. For convenience, in FIGS. 5A to 5C, the echo image in which the echo intensity is highest in red and the echo intensity is lowest in blue is illustrated by gray scale. In this example, a quay and piers exist in the detection range. In FIGS. 5A to 5C, areas corresponding to the quay and the piers are surrounded by broken lines in the echo image.

FIG. 5A illustrates the echo image when the transmission pulse waves at two frequencies are transmitted in one transmission cycle. FIG. 5B illustrates the echo image when the transmission pulse waves at four frequencies are transmitted in one transmission cycle. FIG. 5C illustrates the echo image when the transmission pulse waves at eight frequencies are transmitted in one transmission cycle. Therefore, in FIG. 5A, the transmitter 2 and the receiver 3 may rotate at speeds twice faster than in the case not in the multi-ping method, and in FIGS. 5B and 5C, the transmitter 2 and the receiver 3 may rotate at speeds four times and eight times faster than in the case not in the multi-ping method, respectively.

As illustrated in FIGS. 5A to 5C, the positions of the quay and the piers on the echo image may rotate clockwise with the increase in the rotational speeds of the transmitter 2 and the receiver 3. That is, in connection with the increase in the rotational speeds of the transmitter 2 and the receiver 3, a large error may occur in the position of the target object on the echo image.

Figure 6:
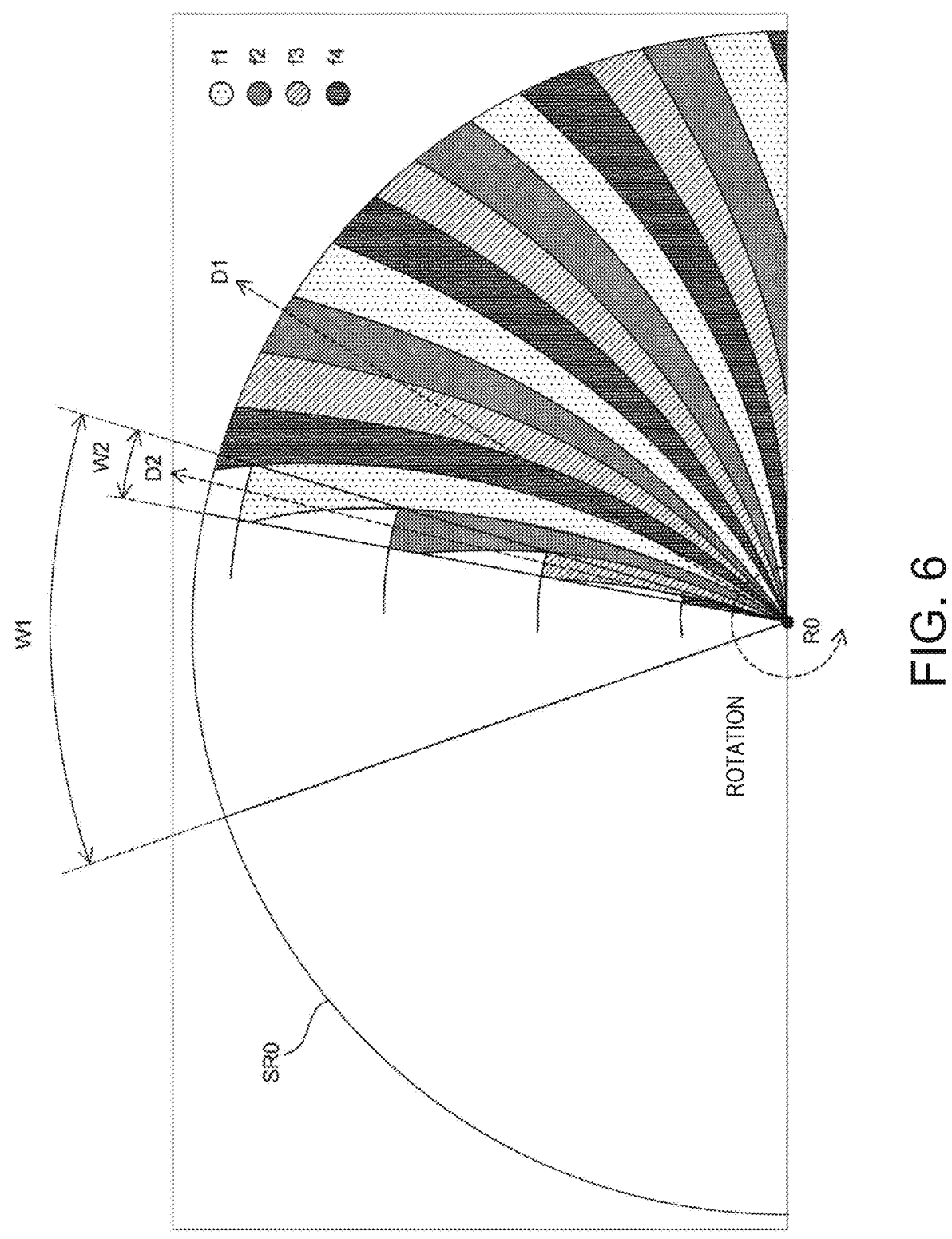
FIG. 6 is a view schematically illustrating an area of a reflection wave at each frequency used for generating an echo signal in a multi-ping method, according to one embodiment.

FIG. 6 is a view schematically illustrating an area of the reflection wave at each frequency used for generating the echo signal in the multi-ping method.

In FIG. 6, the area of the reflection wave used for generating the echo signal is illustrated by different hatchings for different frequencies. R0 is a rotation axis of the transmitter 2 and the receiver 3. In FIG. 6, a state where a detection range SRO is looked vertically downward is illustrated. For convenience, the detection range SRO is illustrated partially as a semicircle range.

At each frequency, the area of the reflection wave used for generating the echo signal may become an area where the widths of the fan area FA in the rotational direction are overlapped continuously, with respect to the lapsed time after the transmission pulse wave is transmitted (i.e., the distance from the receiver 3). Since the fan area FA has a given angle (for example, 6°) in the rotational direction, the width of the fan area FA in the rotational direction may become larger as it separates from the receiver 3 (the rotation axis R0). For this reason, as illustrated in FIG. 6, at each frequency, the width of the area of the reflection wave in the rotational direction used for generating the echo signal may also become larger as it separates from the rotation axis R0.

W1 may be an angle range of the transmission beam TB, and W2 may be an angle range of the fan area FA. In FIG. 6, a state immediately after the transmission pulse wave at the frequency f4 is transmitted in the angle range W1 is illustrated. Here, the transmitter 2 and the receiver 3 may rotate counterclockwise. Note that the rotational direction of the transmitter 2 and the receiver 3 is not limited to this direction, but it may be clockwise.

In FIG. 6, the receiver 3 (fan area FA) is directed to a direction D1 at a timing immediately after the transmission pulse wave at the frequency f1 is transmitted the last time. Therefore, at this timing, the echo signal at the frequency f1 may be generated based on the reflection wave at the frequency f1 from the direction D1. On the other hand, at the timing when the transmission pulse wave at the frequency f4 illustrated in FIG. 6 is transmitted, the receiver 3 (fan area FA) may be directed to a direction of the angle range W2 (direction D2). Therefore, at this timing, the echo signal at the frequency f1 may be generated based on the reflection wave at the frequency f1 from the direction D2. Further, at other timings between these two timings, the echo signal at the frequency f1 may be generated based on the reflection wave at the frequency f1 from a direction between the direction D1 and the direction D2.

Thus, the echo signal for one cycle which is generated at one frequency f1 may be configured by connecting or patching up the echo signals based on the reflection waves (echoes) from various directions. In this case, the directional range used for generating the echo signal for one cycle may become larger as the rotational speeds of the transmitter 2 and the receiver 3 increase. For this reason, as illustrated in FIGS. 5A to 5C, the positional error of the target object on the echo image may become larger as the rotational speeds of the transmitter 2 and the receiver 3 increase.

In order to solve such a problem, in this embodiment, the processing for generating the echo signal for indication is improved. Below, this processing is described.

<Method of Generating Echo Signal>

Figure 7B:
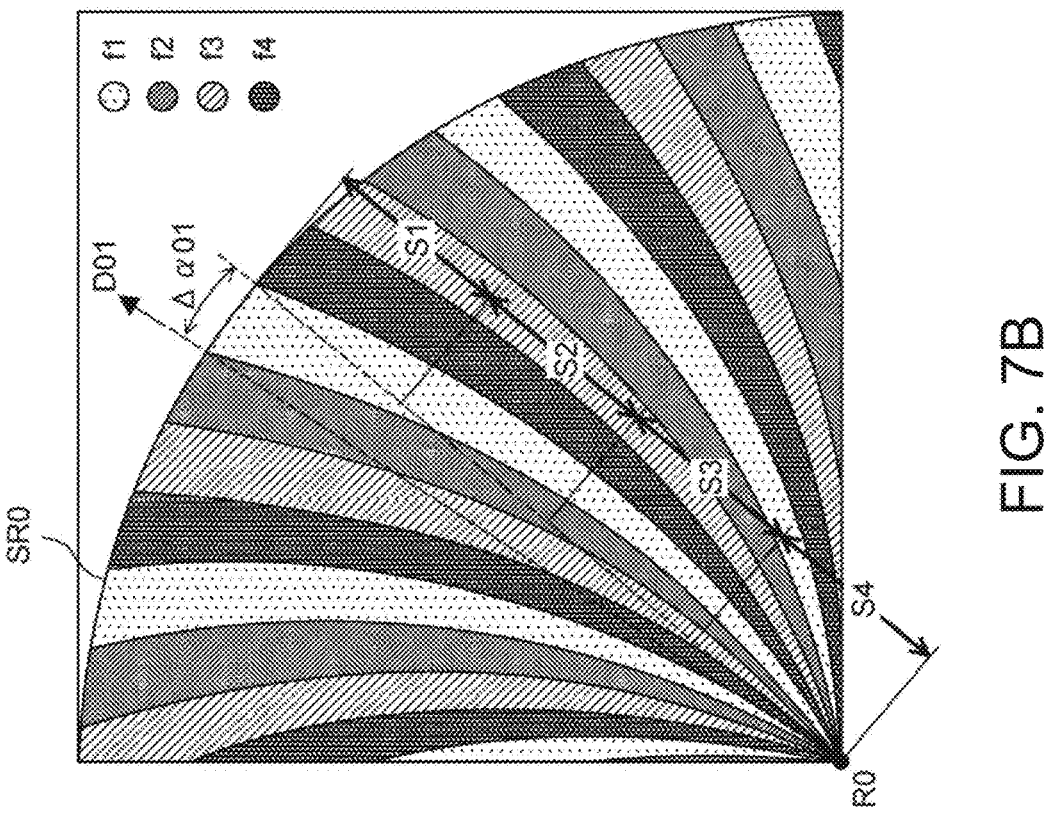
FIGS. 7A and 7B are views illustrating processings for generating an echo signal for indication, according to one embodiment.
Figure 7A:
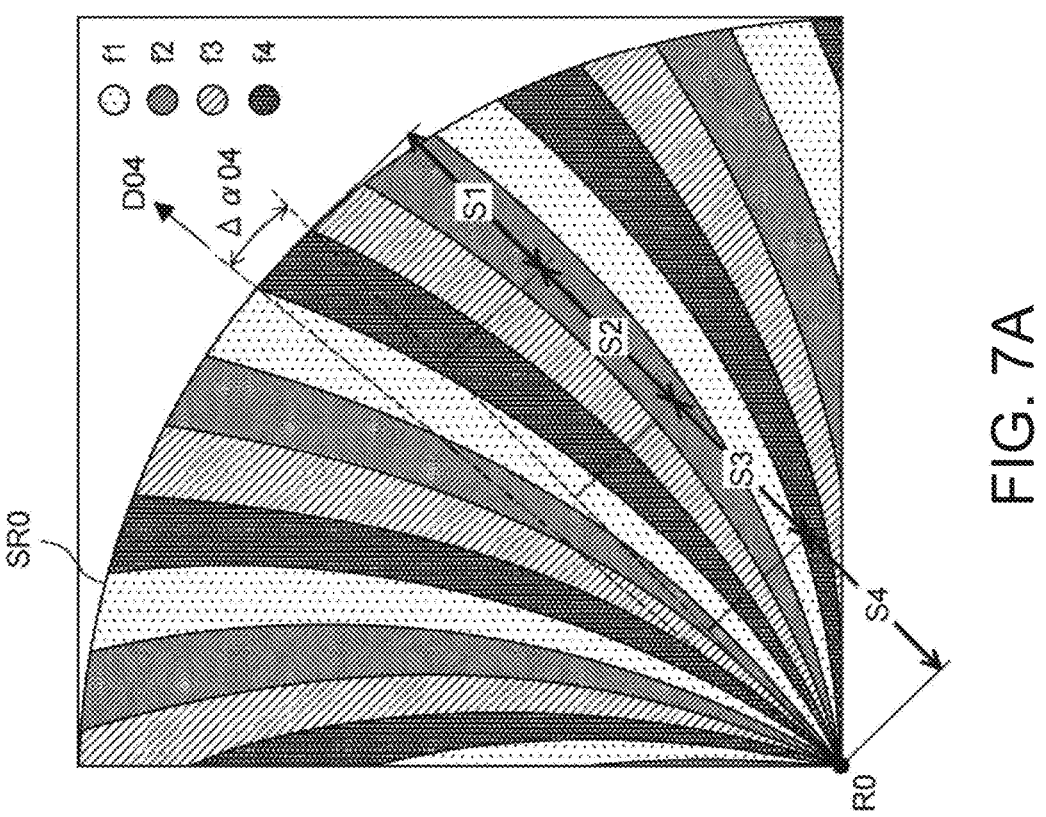

FIGS. 7A and 7B are views illustrating processing for generating the echo signal for indication. In FIGS. 7A and 7B, figures similar to FIG. 6 are illustrated only by a range of ¼ circle (90°).

In FIGS. 7A and 7B, unit rotation angles $\Delta\alpha04$ and $\Delta\alpha01$ are rotation angles corresponding to the transmission cycle of the transmission pulse wave at each frequency. The unit rotation angle $\Delta\alpha04$ in FIG. 7A is a unit rotation angle when the reception of the transmission pulse wave at the frequency f4 which goes and comes back within the detection range SRO is finished. The unit rotation angle $\Delta\alpha01$ in FIG. 7B is a unit rotation angle when the reception of the transmission pulse wave at the frequency f1 which goes and comes back within the detection range SRO is finished. The unit rotation angle may be 6°, for example.

As illustrated in FIG. 7A, the reception signals at the frequencies f1-3 may be acquired from the range of the unit rotation angle $\Delta\alpha04$, along with the reception signal at the frequency f4. Further, as illustrated in FIG. 7B, the reception signals at the frequencies f2-f4 may be acquired from the range of the unit rotation angle $\Delta\alpha01$, along with the reception signal at the frequency f1. Also for the range of other unit rotation angles, the reception signals at the frequencies f1-f4 may be similarly acquired.

In this embodiment, the echo signal for indication in the direction of the unit rotation angle $\Delta\alpha04$ may be generated from the reception signal at each frequency acquired from the range of the unit rotation angle $\Delta\alpha04$ in FIG. 7A. Further, the echo signal for indication in the direction of the unit rotation angle $\Delta\alpha01$ may be generated from the reception signal at each frequency acquired from the range of the unit rotation angle $\Delta\alpha01$ in FIG. 7B. Also for other unit rotation angles, the echo signal for indication in the direction of each unit rotation angle may be generated from the reception signal at each frequency acquired from the range of each unit rotation angle.

Here, the direction of the unit rotation angle may be, for example, a direction corresponding to a terminating position of this unit rotation angle in the rotational direction. For example, in FIG. 7A, a direction D04 may be a direction of the unit rotation angle $\Delta\alpha04$, and in FIG. 7B, a direction D01 may be a direction of the unit rotation angle $\Delta\alpha01$. Note that a method of setting the direction of the unit rotation angle is not limited to this configuration. For example, a direction corresponding to an intermediate position of the unit rotation angle in the rotational direction may be set as the direction of the unit rotation angle, or a direction corresponding to a starting position of the unit rotation angle in the rotational direction may be set as the direction of the unit rotation angle.

The echo signal in the direction of the unit rotation angle may be generated based on, for example, among the reception signals at respective frequencies acquired from a plurality of sections which are obtained by dividing the range of the unit rotation angle into the number of frequencies in a direction separating from the rotation axis R0, the reception signal at a frequency with the largest quantity of signal components in each section. In this embodiment, since the four frequencies (frequencies f1-f4) are used for the transmission of the transmission pulse wave, the range of the unit rotation angle may be divided into four in the direction separating from the rotation axis R0 to set four sections S1-S4.

Each section may be set, for example, by dividing the range of the unit rotation angle equally into the number of frequencies in the direction separating from the rotation axis R0. In the examples of FIGS. 7A and 7B, the ranges of the unit rotation angles $\Delta\alpha04$ and $\Delta\alpha01$ are equally divided into four in the direction separating from the rotation axis R0 to set the sections S1-S4. Therefore, the sections S1-S4 may have the same width in the direction separating from the rotation axis R0. Note that the method of setting the sections is not limited to this configuration, but the widths of the plurality of sections may differ from each other in the direction separating from the rotation axis R0.

In FIG. 7A, the reception signal at the frequency f4 and the reception signal at the frequency f1 may be acquired from the section S1 of the unit rotation angle $\Delta\alpha04$. In this section S1, when comparing the range where the reception signal at the frequency f4 is acquired with the range where the reception signal at the frequency f1 is acquired, the range where the reception signal at the frequency f4 is acquired may be wider than the range where the reception signal at the frequency f1 is acquired. Thus, in the section S1, the signal component of the reception signal at the frequency f4 may be more dominant. Therefore, the echo signal of the section S1 may be generated from the reception signal at the frequency f4 acquired from the section S1.

Similarly, in the section S2 of FIG. 7A, since the signal component of the reception signal at the frequency f1 is more dominant than the signal component of the reception signal at the frequency f2, the echo signal may be generated from the reception signal at the frequency f1 acquired from the section S2. In the section S3 of FIG. 7A, since the signal component of the reception signal at the frequency f2 is more dominant than the signal component of the reception signal at the frequency f3, the echo signal may be generated from the reception signal at the frequency f2 acquired from the section S3. In the section S4 of FIG. 7A, since the signal component of the reception signal at the frequency f3 is more dominant than the reception signal at the frequency f4, the echo signal may be generated from the reception signal at the frequency f3 acquired from the section S4.

Similarly, in the section S1 of FIG. 7B, the echo signal may be generated from the reception signal at the frequency f1 acquired from the section S1. In the section S2 of FIG. 7B, the echo signal may be generated from the reception signal at the frequency f2 acquired from the section S2. In the section S3 of FIG. 7B, the echo signal may be generated from the reception signal at the frequency f3 acquired from the section S3. In the section S4 of FIG. 7B, the echo signal may be generated from the reception signal at the frequency f4 acquired from the section S4.

The echo signal at each direction may be generated for every given angle of depression specified by the resolution of the reception beam. In this case, the echo signal at each angle of depression may be generated by the following method.

First, for each of the frequencies, the decimation, the bandlimitting filter, and the beamforming may be applied to the reception signal at each frequency extracted for each of the channels CH1-CHm of FIG. 4 to calculate the echo signal at each angle of depression (intermediate echo signal). Next, from the calculated intermediate echo signal at each frequency, a signal portion of a period corresponding to the unit rotation angle of this direction may be extracted. Then, the signal portions of the extracted intermediate echo signals at the respective frequencies may be arranged in an order of later receiving timing (i.e., the latest receiving timing comes first) to generate the echo signal for indication at each angle of depression in this direction.

Figure 8:
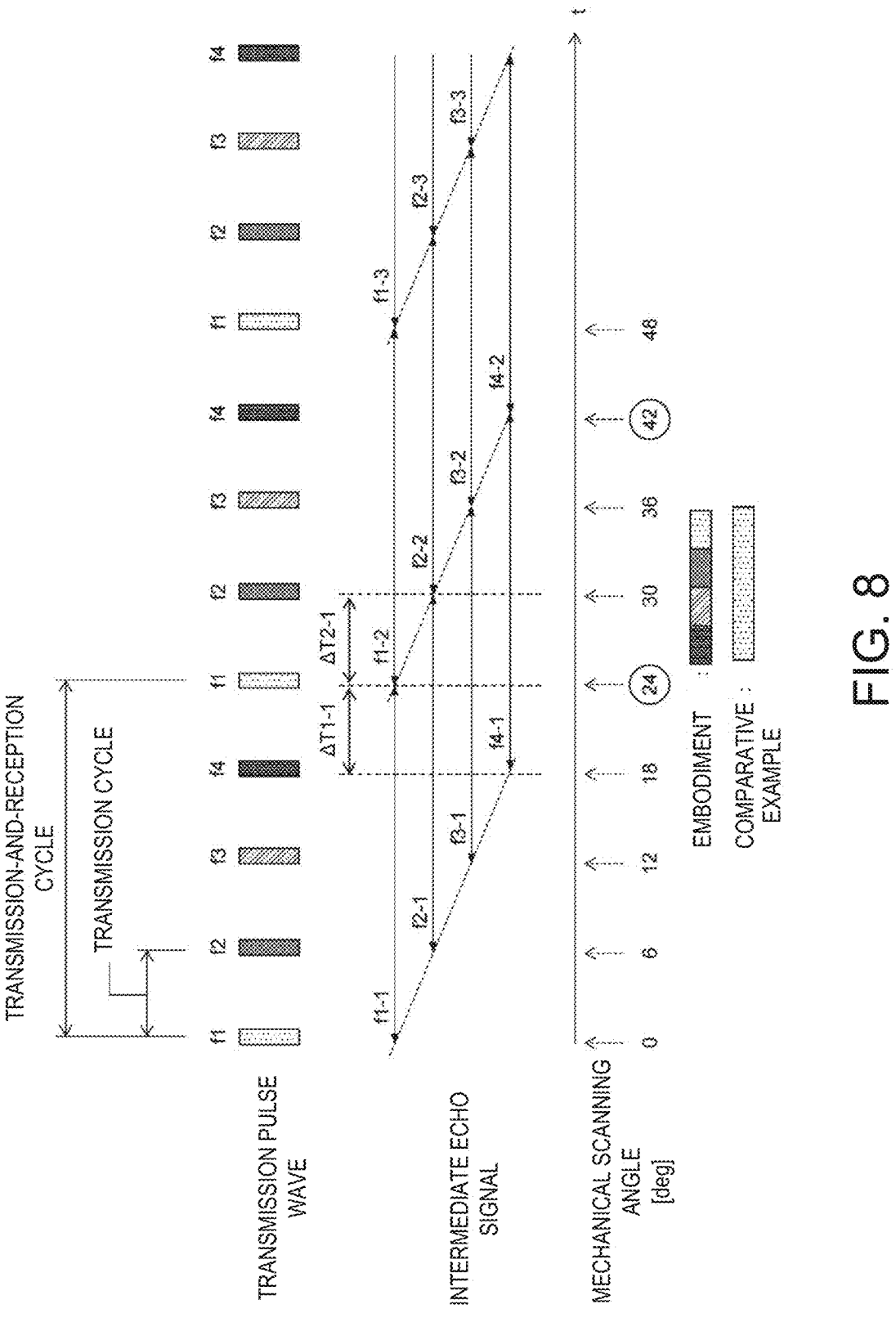
FIG. 8 is a timing chart illustrating a method of generating an echo signal at each angle of depression, according to one embodiment.

FIG. 8 is a timing chart illustrating a method of generating the echo signal at each angle of depression.

In FIG. 8, the method of generating the echo signal at one angle of depression is illustrated. In the upper row, the transmission timings of the transmission pulse wave at the frequencies f1-f4 are schematically illustrated. In the middle row, acquisition periods of the intermediate echo signals at the respective frequencies are illustrated. "f1-$k$ to f4-$k$" of the middle row indicate the acquisition periods of the intermediate echo signal for the k-th transmission of the transmission pulse wave at the frequencies f1-f4. In the lower row, a mechanical scanning angle of the fan area FA is illustrated. The mechanical scanning angle of the fan area FA corresponds to the rotation angle of the receiver 3 from the reference position.

At a given transmission cycle, the transmission pulse waves at the frequencies f1-f4 may be transmitted in order. The transmission cycle may be set as one fourth (¼) of the period during which the transmission pulse wave at one frequency goes and comes back within the detection range SR0 (i.e., the transmission-and-reception period of the transmission pulse wave). The transmission cycle may be a period corresponding to the unit rotation angle described above. In FIG. 8, the unit rotation angle is 6°. In this case, when the mechanical-scanning angle is 42°, the transmission-and-reception period of the transmission pulse wave at the frequency f4 transmitted for the first time may be finished, and the intermediate echo signals at all the frequencies according to the transmission of the transmission pulse waves at the frequencies f1-f4 for the first time may be completed.

Here, the range of the unit rotation angle corresponding to the mechanical scanning angle of 24° may be a period $\Delta T1\text{-}1$ where the mechanical scanning angle is 18° to 24°. Therefore, in this case, from the intermediate echo signals of frequencies f1-f4, signal portions of the intermediate echo signals included in the period $\Delta T1\text{-}1$ may be extracted. Further, in this range of the unit rotation angle, the ranges where the reception signals at the frequencies f1-f4 are acquired may be arranged in an order of farness from the rotation axis R0 (i.e., the farthest distance comes first), similarly to the case of FIG. 7B. Therefore, the extracted signal portion at each frequency may be arranged in the order of later receiving timing (i.e., frequencies f4, f3, f2, and f1), and the echo signal for indication in the direction of the 240 mechanical scanning angle may be generated.

In FIG. 8, directly below the position at which the mechanical scanning angle is 24°, a state where the signal portions extracted from the intermediate echo signals at the frequencies f4, f3, f2, and f1 are arranged in order to generate the echo signal in the direction of the 240 mechanical scanning angle is schematically illustrated. Further, directly below that, a state of the echo signal by a conventional method, i.e., when the echo signal in the direction where the mechanical scanning angle is 240 is generated only from the intermediate echo signal at the frequency f1 is illustrated.

Also at the next unit scanning angle, the signal portion included in a period $\Delta T2\text{-}1$ may be similarly extracted from the intermediate echo signal at each frequency. In this case, since the transmission waves are received in order of the frequencies f2, 3, f4, and f1, the signal portion of the extracted intermediate echo signal at each frequency may be arranged in order of the frequencies f1, f4, B, and f2, and the echo signal for indication in the direction where the mechanical scanning angle is 300 may be generated. Also at subsequent unit scanning angles, similar processing may be performed to generate the echo signal for indication at each direction.

<Concrete Processing>

Figure 9A:
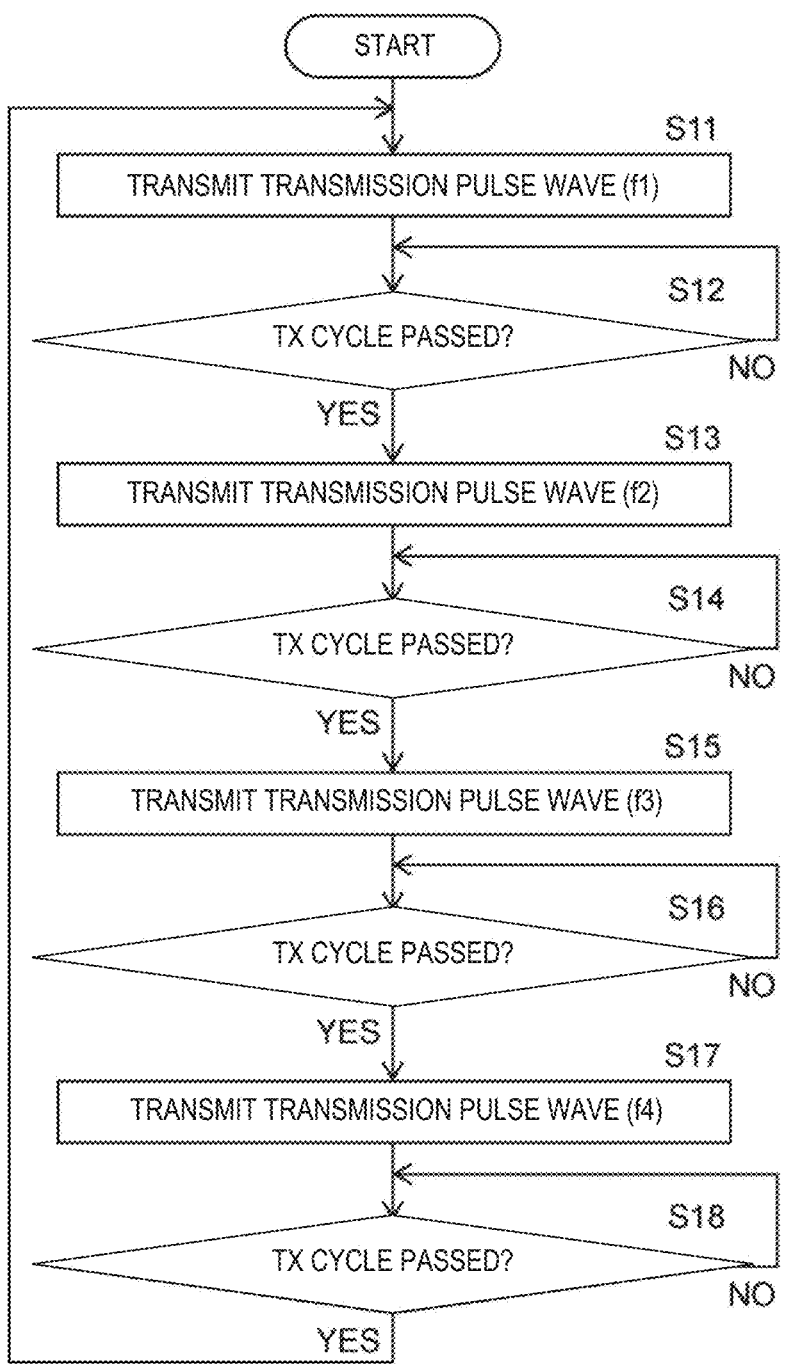
FIG. 9A is a flowchart illustrating transmission processing of a transmission pulse wave, according to one embodiment.

FIG. 9A is a flowchart illustrating transmission processing of the transmission pulse wave. This processing may be performed by the controller 11 in FIG. 4.

The controller 11 may make the transmitter 2 transmit the transmission pulse waves at the frequencies f1-f4 in order (S11, S13, S15, S17), each time the transmission cycle passes (S12, S14, S16: YES). After the transmission of the transmission pulse wave at the frequency f4 (S17), if the transmission cycle passes (S18: YES), the controller 11 may return the processing to Step S11, where it repeats similar processing. Therefore, the transmissions of the transmission pulse waves at the frequencies f1-f4 may be repeated cyclically.

Figure 9B:
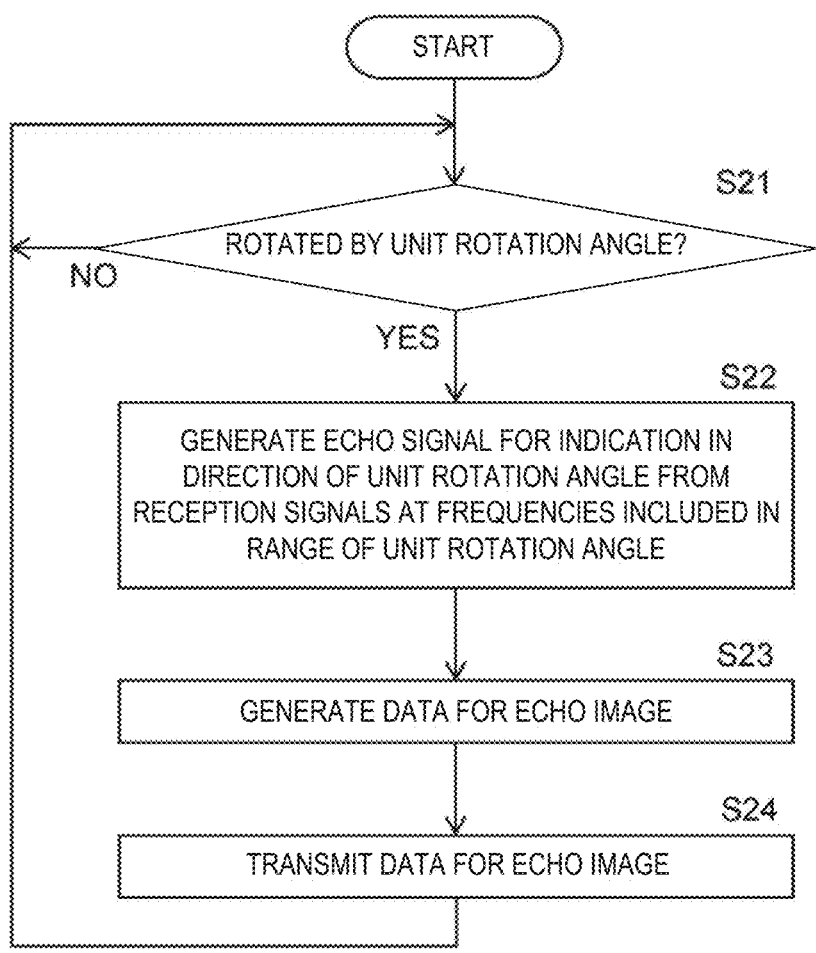
FIG. 9B is a flowchart illustrating generation processing of data for echo image, according to one embodiment.

FIG. 9B is a flowchart illustrating generation processing of data for echo image. This processing may be performed by the signal processor 20 in FIG. 4.

Each time the receiver 3 rotates by the unit rotation angle (S21: YES), the signal processor 20 may perform processings at and after Step S22. At Step S22, the signal processor 20 may generate the echo signal for indication in the direction of the unit rotation angle based on the reception signals at the frequencies f1-f4 included in the range of the unit rotation angle. The signal processor 20 may generate the data for echo image from the generated echo signal for indication (S23), and transmit the generated data to the display unit 8 (S24).

Figure 10:
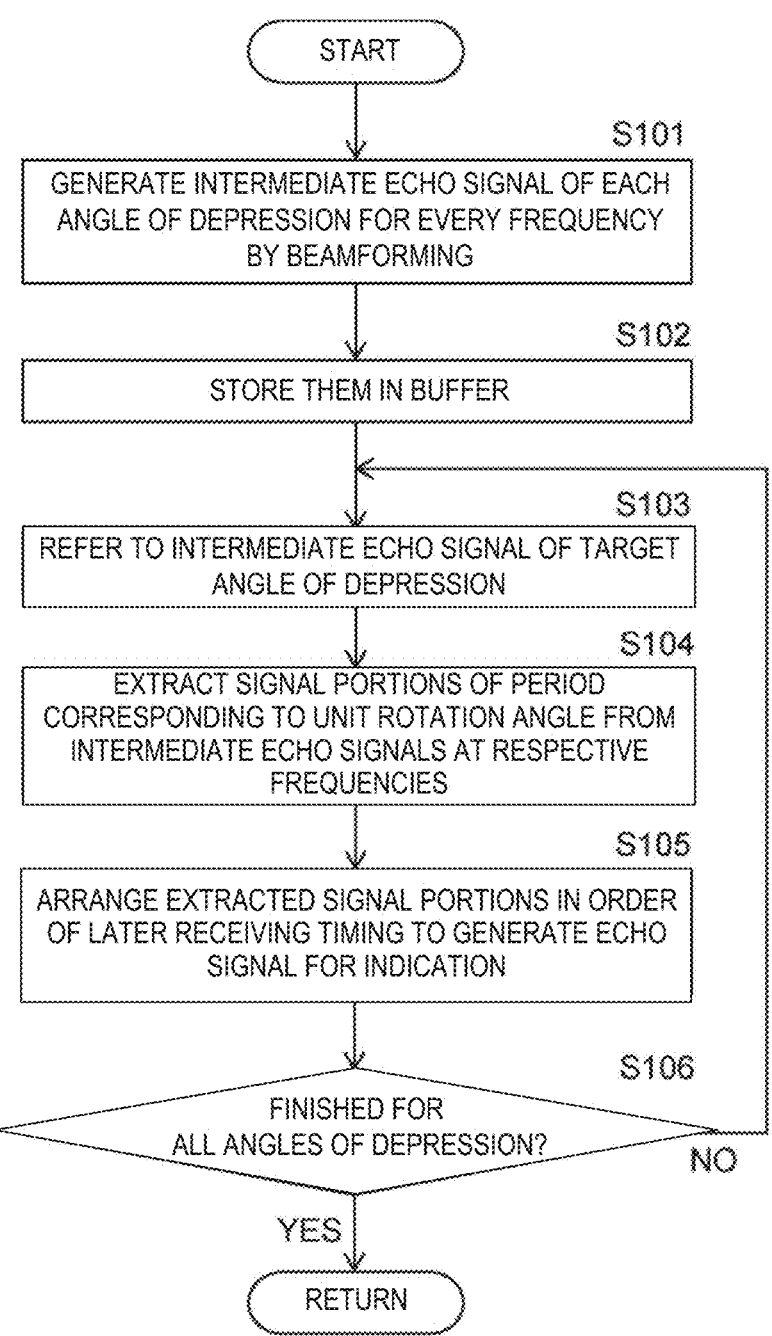
FIG. 10 is a flowchart illustrating generation processing of the echo signal for indication, according to one embodiment.

FIG. 10 is a flowchart illustrating the generation processing of the echo signal for indication at Step S22 in FIG. 9B. This processing may correspond to the processing described with reference to FIG. 8.

The signal processor 20 may apply the decimation, the bandlimitting filter, and the beamforming to the reception signal at each frequency extracted for each of the channels CH1-CHm to generate the intermediate echo signal at each angle of depression for each of the frequencies (S101), and make the buffer store the generated intermediate echo signal at each frequency (S102). The signal processor 20 may refer to the intermediate echo signal at the angle of depression to be processed among the intermediate echo signals of the angles of depression stored in the buffer (S103). The signal processor 20 may extract the signal portions of the period corresponding to the unit rotation angle from the referred intermediate echo signals at the respective frequencies (S104). The signal processor 20 may arrange the extracted signal portions at the respective frequencies in the order of later receiving timing to generate the echo signal for indication at the given angle of depression in the direction of the unit rotation angle (S105).

The signal processor 20 may determine whether the generation of the echo signal for indication is finished for all the angles of depression (S106). If the processing has not been finished for all the angles of depression (S106: NO), the signal processor 20 may set the next angle of depression as the angle of depression to be processed, and perform processings at and after Step S103. Therefore, the echo signal for indication at the next angle of depression in the direction of this unit rotation angle may be generated. The signal processor 20 may repeatedly perform the processings at and after Step S103, while changing the angle of depression to be processed, until the processings for all the angles of depression are finished. In this way, the echo signals for indication at all the angles of depression in the direction of this unit rotation angle may be generated (S106: YES). Therefore, the signal processor 20 may end the processing of FIG. 10, and transit to Step S23 in FIG. 9B.

Figures 11A, 11B:
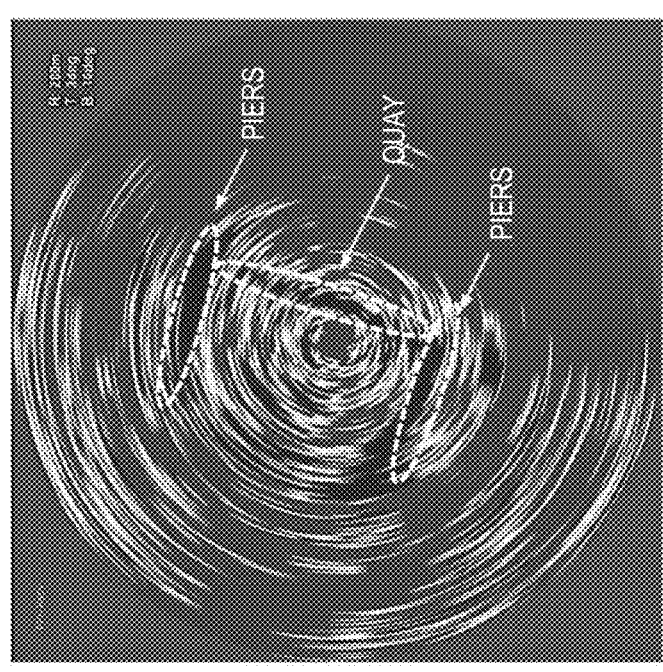
FIG. 11A is a view illustrating one example of indication of the echo image, according to one embodiment.
FIG. 11B is a view illustrating one example of indication of the echo image, according to a comparative example.

FIG. 11A is a view illustrating one example of indication of the echo image generated by the processings of FIGS. 9B and 10.

In FIG. 11A, the echo image when the transmitter 2 and the receiver 3 may rotate at a speed twice faster than the case not in the multi-ping method is illustrated. Therefore, in this example of indication, the transmission pulse waves at two frequencies may be transmitted in order for every unit rotation angle, and the echo signal for indication in the direction of the unit rotation angle may be generated from the reception signal at each frequency which is acquired from the range of the unit rotation angle. In FIG. 11B, one example of indication of the double-speed (×2) echo image generated by the conventional processing is illustrated for a comparison. The echo image in FIG. 11B is the same as the echo image in FIG. 5A.

As illustrated in FIG. 11A, when the processing according to this embodiment is used, the rotation of the quay and the piers in the clockwise direction may be suppressed as compared with the comparative example of FIG. 11B. Further, the positions of the quay and the piers in the echo image of FIG. 11A may be substantially the same as the positions of the quay and the piers in the echo image of the common pulse method when not using the multi-ping method. Therefore, by the processing according to this embodiment, as compared with the comparative example, the positional error of the target object on the echo image can be suppressed, and the positional accuracy of the target object equivalent to the case of the common pulse method which does not use the multi-ping method can be realized.

Figures 12A, 12B, 12C:
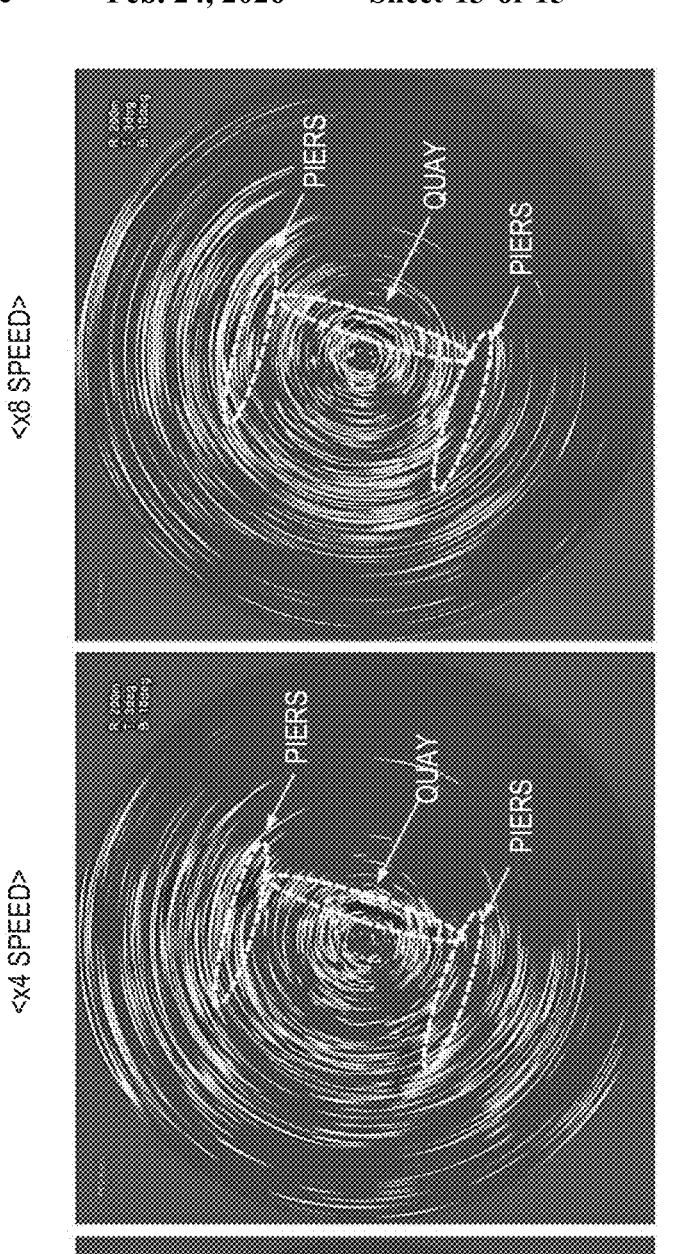
FIGS. 12A to 12C are views illustrating examples of indication of the echo image, according to one embodiment.

FIGS. 12A to 12C are views illustrating one example of indication of the echo image which is generated by similar processings to FIGS. 9B and 10.

In FIGS. 12A to 12C, the echo images when rotating the transmitter 2 and the receiver 3 at ×2, ×4, and ×8 speeds as compared with the case not in the multi-ping method are illustrated. The echo image of FIG. 12A is the same as FIG. 11A (×2). The echo image of FIG. 12B may be generated by transmitting the transmission pulse waves at the four frequencies f1-f4 in order for every unit rotation angle, similarly to FIG. 8. The echo image of FIG. 12C may be generated by transmitting the transmission pulse waves at eight frequencies in order for every unit rotation angle.

As illustrated in FIGS. 12A to 12C, when the processing according to this embodiment is used, the positions of the quay and the piers on the echo image may hardly change even if the rotational speeds of the transmitter 2 and the receiver 3 are increased. Therefore, according to the processing of this embodiment, the positional error of the target object on the echo image can be suppressed effectively, regardless of the rotational speeds of the transmitter 2 and the receiver 3.

Effects of Embodiment

According to this embodiment, the following effects may be attained.

As illustrated in FIGS. 7A and 7B, the echo signals for indication in the directions D04 and D01 of the unit rotation angles Δα04 and Δα01 may be generated from the reception signal at each frequency acquired from the ranges of the unit rotation angles Δα04 and Δα01. For this reason, it is suppressed that the reception signals other than those within the ranges of the unit rotation angles Δα04 and Δα01 are used for the generation of the echo signals. Therefore, as illustrated in FIG. 11A and FIGS. 12A to 12C, the positional error of the target object on the echo image can be suppressed.

Further, as described with reference to FIGS. 7A and 7B, the signal processor 20 may generate the echo signal for indication based on, among the reception signals at the respective frequencies acquired from the plurality of sections S1-S4 which divide the ranges of the unit rotation angles Δα04 and Δα01 into the number of frequencies in the direction separating from the rotation axis R0, the reception signal with the largest quantity of signal components in each of the sections S1-S4. According to this processing, since the reception signal at the frequency with the largest quantity of signal components is used for generating the echo signal in each of the sections S1-S4, the state of the echo in the section may be reflected on the echo signal appropriately. Therefore, the echo signal for indication can be generated appropriately.

Further, as illustrated in FIGS. 7A and 7B, the sections S1-S4 may be formed by dividing the ranges of the unit rotation angles Δα04 and Δα01 equally into the number of frequencies in the direction separating from the rotation axis R0. Therefore, as illustrated in FIG. 8, the echo signal for indication in the direction of the unit rotation angle can be generated from the reception signal at each frequency included in the same periods ΔT1-1 and ΔT2-1. Therefore, the generation processing of the echo signal for indication can be performed simply.

Further, as illustrated in FIG. 10, the signal processor 20 may perform the processing including calculating the intermediate echo signal at each angle of depression for each of the frequencies by beamforming based on the reception signal at each of the frequencies f1-f4 (S101), extracting the signal portion of the period corresponding to the unit rotation angle from the intermediate echo signal at each frequency (S104), and arranging the extracted signal portions in the order of later receiving timing to generate the echo signal for indication in the direction of the unit rotation angle (S105), and repeat the series of processings for each angle of depression (S106). According to this configuration, by the simple processing in which the signal portion is extracted from the intermediate echo signal at each frequency, and the signal portions are arranged in order, the echo signal for indication at each angle of depression in the direction of the unit rotation angle can be generated. Therefore, the generation processing of the echo signal for indication can be performed simply.

In this case, as illustrated in FIG. 8, among divided parts when dividing the entire range of the intermediate echo signal at each frequency equally into the number of frequencies, the signal portions extracted at Step S104 may be divided parts included in the periods ΔT1-1 and ΔT2-1 corresponding to the unit rotation angle. Therefore, since the extraction range of the signal portion for the intermediate echo signal is specified by the ranges of the periods ΔT1-1 and ΔT2-1, the signal portion can be easily extracted from the intermediate echo signal at each frequency. Therefore, the generation processing of the echo signal for indication can be performed simply.

MODIFICATIONS

The present disclosure is not limited to the above embodiment, and various changes of the embodiment of the present disclosure other than the above-described configurations are also possible.

For example, the method of generating the echo signal for indication in the direction of the unit rotation angle from the reception signal at each frequency acquired from the range of the unit rotation angle is not limited to the method described with reference to FIGS. 7A and 7B, but it may be other methods.

Figure 13B:
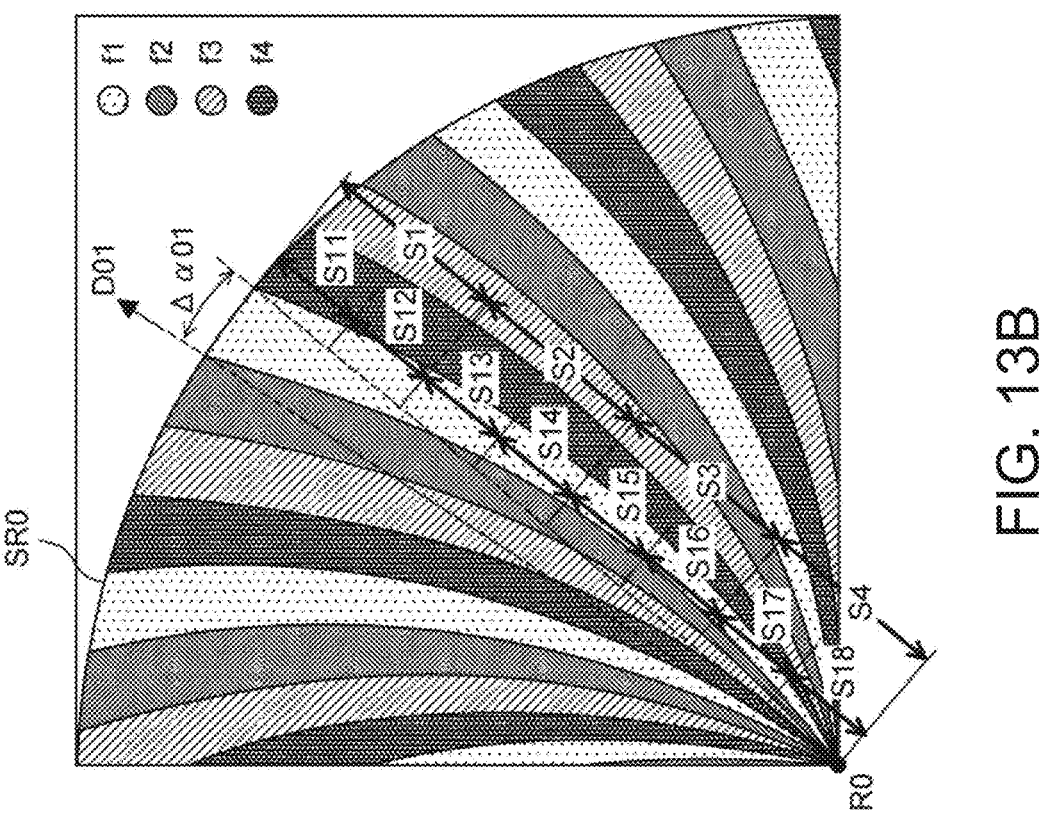
FIGS. 13A and 13B are views illustrating a method of dividing an area of a unit rotation angle, according to a modification.
Figure 13A:
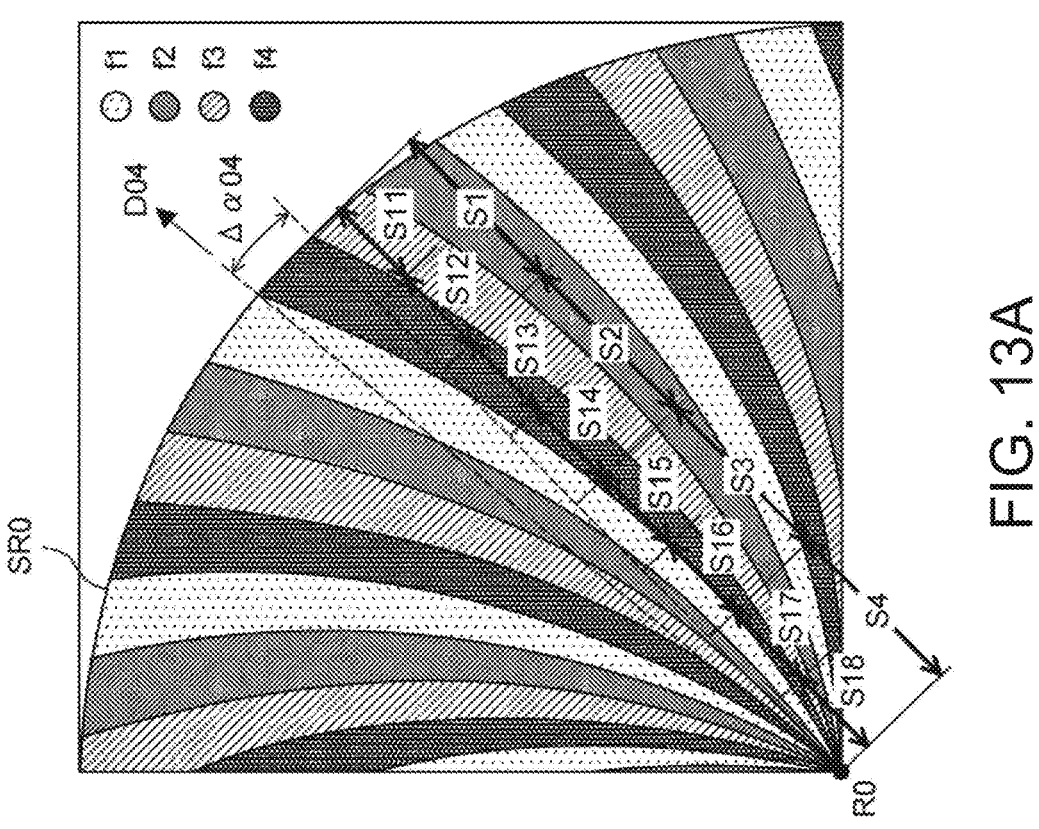

Although according to the method of FIGS. 7A and 7B the sections are formed by dividing the range of the unit rotation angle into the number of frequencies (here, four) in the direction separating from the rotation axis R0, the number of division of the range of the unit rotation angle may not be the number of frequencies. For example, as illustrated in FIGS. 13A and 13B, the sections S1-S4 may be further divided into two in the direction separating from the rotation axis R0 to form eight sections S11-S18. Also in this case, the reception signal at the frequency with the largest quantity of signal components acquired from each of the sections S11-S18 may be used as the reception signal of each section.

Alternatively, the intermediate echo signal at each frequency acquired from the range of the unit rotation angle may be weighted, and the echo signal for indication may be generated by superimposing the echo signal at the frequency based on the weighting.

Figure 14:
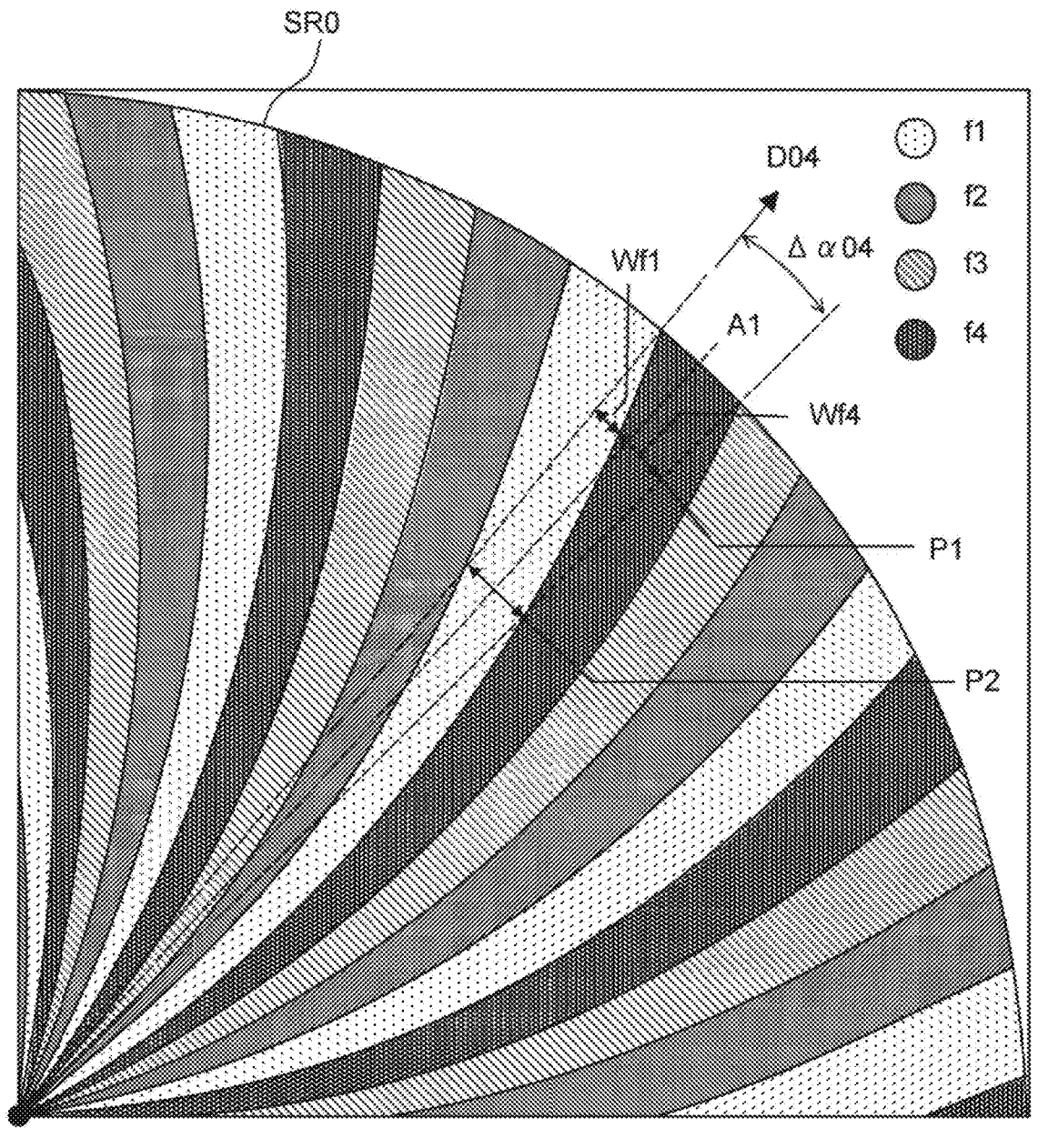
FIG. 14 is a view illustrating a method of generating an echo signal, according to another modification.

In this case, for example, as illustrated in FIG. 14, an axis A1 extending in the direction separating from the rotation axis R0 may be set in the range of the unit rotation angle. Then, according to the balance of the signal component at each frequency at each position on this axis A1, the echo signal at the frequency acquired from this position may be weighted for the superimposing.

For example, at a position P1 on the axis A1, the quantities of the signal components at the frequencies f4 and f1 may be defined by widths Wf1 and Wf4, respectively. Therefore, the echo signal at this position P1 may be calculated as a value obtained by adding a value obtained by multiplying the echo signal at the frequency f4 at this position P1 by $Wf4/(Wf1+Wf4)$ to a value obtained by multiplying the echo signal at the frequency f1 at this position P1 by $Wf1/(Wf1+Wf4)$. Further, there may be only the signal component at the frequency f1 at a position P2 on the axis A1. For this reason, as for the echo signal at this position P1, the echo signal at the frequency f1 at this position may be used as it is.

Note that the weight settings at each position may be stored beforehand in the signal processor 20. The signal processor 20 may apply the weighting at each position to the echo signal at each frequency acquired from each position to generate the echo signal for indication.

Further, although in the above embodiment the signal portion of the period corresponding to the unit rotation angle is extracted from the echo signal at each frequency at each angle of depression to generate the echo signal for indication, the signal portion of the period corresponding to the unit rotation angle may be first extracted from the reception signal at each frequency extracted for each of the channels CH1-CHm, and the extracted signal portions may be arranged in the order of later receiving timing to generate the reception signal for each of the channels CH1-CHm. In this case, the decimation, the bandlimitting filter, and the beamforming may be applied to the reception signal generated for each of the channels CH1-CHm to generate the echo signal at each angle of depression in the direction corresponding to the unit rotation angle.

Note that, in this processing, since the reception signal generated for each of the channels CH1-CHm includes the plurality of frequencies, a part where the continuity of the phase is spoiled may occur in the generated reception signal. For this reason, in order to generate the echo signal at each angle of depression more appropriately, it may be preferred to extract the signal portion corresponding to the unit rotation angle from the intermediate echo signal at each frequency after beamforming to generate the echo signal at each angle of depression, similarly to the above embodiment.

Further, the parameter values, such as the angle, illustrated in the above embodiment are examples, and they may be changed suitably. Further, although in the above embodiment the unit rotation angle and the angle of the fan area FA in the rotational direction are the same (6°), they may be different from each other.

Further, various changes of the embodiment of the present disclosure are suitably possible within the concept of the appended claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open"

terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Underwater Detection Device
2 Transmitter
3 Receiver
4 Actuator
11 Controller
20 Signal Processor
$\Delta\alpha1$, $\Delta\alpha4$ Unit Rotation Angle
S1-S4, S11-S18 Section
D01, D04 Direction of Unit Rotation Angle

What is claimed is:

1. An underwater detection device, comprising:
a transmitter configured to transmit a transmission wave;
a receiver configured to receive a reflection wave of the transmission wave;
an actuator configured to rotate the transmitter and the receiver in a mutually synchronized fashion;
a controller configured to control the transmitter to transmit a plurality of transmission waves at mutually different frequencies in order, for every given unit rotation angle; and
a signal processor configured to generate an echo signal for indication in a direction of the unit rotation angle based on a reception signal at each of the frequencies acquired from a range of the unit rotation angle, wherein the echo signal is generated based on, among the reception signals at the respective frequencies acquired from a plurality of sections that divide a distance measurable within a given unit rotation angle into the number of frequencies in a direction separating from a rotation axis, a reception signal at a frequency with a largest intensity of signal components in each of the sections,
wherein the signal processor is further adapted to perform processing for every angle of depression, the processing including:
calculating an intermediate echo signal at each angle of depression for each of the frequencies by beamforming based on the reception signal at the frequency; and
extracting a signal portion of a period corresponding to the unit rotation angle from the intermediate echo signal at each of the frequencies, and arranging the extracted signal portions in order of later receiving timing to generate the echo signal for indication in the direction of the unit rotation angle.

2. The underwater detection device of claim 1, wherein the sections are formed by dividing the range of the unit rotation angle equally into the number of frequencies in the direction separating from the rotation axis.

3. The underwater detection device of claim 1, wherein, among divided parts when the entire range of the intermediate echo signal at each frequency is equally divided into the number of frequencies, the signal portion is a divided part included during the period corresponding to the unit rotation angle.

4. An underwater detection method performed by an underwater detection device, the underwater detection method comprising:
rotating a transmitter configured to transmit a transmission wave and a receiver configured to receive a reflection wave of the transmission wave in a mutually synchronized fashion;
controlling the transmitter transmit a plurality of transmission waves at mutually different frequencies in order, for every given unit rotation angle; and
generating an echo signal for indication in a direction of the unit rotation angle based on a reception signal at each of the frequencies acquired from a range of the unit rotation angle,
wherein the echo signal is generated based on, among the reception signals at the respective frequencies acquired from a plurality of sections that divide a distance measurable within a given unit rotation angle into the number of frequencies in a direction separating from a rotation axis, a reception signal at a frequency with a largest intensity of signal components in each of the sections,
wherein the underwater detection method further comprises performing processing for every angle of depression, the processing including:
calculating an intermediate echo signal at each angle of depression for each of the frequencies by beamforming based on the reception signal at the frequency; and
extracting a signal portion of a period corresponding to the unit rotation angle from the intermediate echo signal at each of the frequencies, and arranging the extracted signal portions in order of later receiving timing to generate the echo signal for indication in the direction of the unit rotation angle.

* * * * *